(12) United States Patent
Kashima et al.

(10) Patent No.: US 11,105,067 B2
(45) Date of Patent: Aug. 31, 2021

(54) WORK MACHINE

(71) Applicant: KOMATSU LTD., Tokyo (JP)

(72) Inventors: Katsunaga Kashima, Tokyo (JP); Shoichiro Asai, Tokyo (JP); Katsuya Ino, Tokyo (JP)

(73) Assignee: KOMATSU LTD., Tokyo (JP)

( * ) Notice: Subject to any disclaimer, the term of this patent is extended or adjusted under 35 U.S.C. 154(b) by 0 days.

(21) Appl. No.: 16/617,093

(22) PCT Filed: Aug. 23, 2018

(86) PCT No.: PCT/JP2018/031101
§ 371 (c)(1),
(2) Date: Nov. 26, 2019

(87) PCT Pub. No.: WO2019/049672
PCT Pub. Date: Mar. 14, 2019

(65) Prior Publication Data
US 2020/0256037 A1    Aug. 13, 2020

(30) Foreign Application Priority Data
Sep. 7, 2017   (JP) .............................. JP2017-171816

(51) Int. Cl.
*E02F 9/08* (2006.01)
*E02F 9/12* (2006.01)
*E02F 9/22* (2006.01)

(52) U.S. Cl.
CPC ............ *E02F 9/0875* (2013.01); *E02F 9/121* (2013.01); *E02F 9/2267* (2013.01);
(Continued)

(58) Field of Classification Search
CPC ...... E02F 9/0875; E02F 9/2275; E02F 9/2267
See application file for complete search history.

(56) References Cited

U.S. PATENT DOCUMENTS 1,793,438 A * 2/1931 Ferris ...................... E02F 3/308
414/690
5,940,997 A   8/1999 Toyooka et al.
(Continued)

FOREIGN PATENT DOCUMENTS

CN          1223324 A      7/1999
CN        101124411 A      2/2008
(Continued)

*Primary Examiner* — Thomas E Lazo
*Assistant Examiner* — Michael Quandt
(74) *Attorney, Agent, or Firm* — Faegre Drinker Biddle & Reath LLP

(57) ABSTRACT

A hydraulic excavator includes: a revolving frame; a work implement including a first actuator and a second actuator; a control valve; and a first pipe through which hydraulic oil flows between the control valve and each of the first actuator and the second actuator. The first pipe includes: a first conduit connected to the control valve; a second conduit and a third conduit that are connected to the first actuator and the second actuator, respectively; and a first branch portion at which the first conduit branches into the second conduit and the third conduit. A first region and a second region are on one side and the other side respectively with respect to the virtual straight line passing through a center of swing of the revolving frame. In the first region, a work implement is disposed. In the second region, the control valve and the first branch portion are disposed.

16 Claims, 17 Drawing Sheets

(52) U.S. Cl.
CPC .......... *E02F 9/2271* (2013.01); *E02F 9/2275* (2013.01); *B60Y 2200/412* (2013.01); *E02F 9/2221* (2013.01); *E02F 9/2296* (2013.01); *F15B 2211/20546* (2013.01); *F15B 2211/30595* (2013.01)

(56) References Cited

U.S. PATENT DOCUMENTS

| | | |
|---|---|---|
| 2009/0007464 A1 | 1/2009 | Itou |
| 2015/0369103 A1 | 12/2015 | Kobayashi et al. |

FOREIGN PATENT DOCUMENTS

| | | |
|---|---|---|
| CN | 104395577 A | 3/2015 |
| CN | 106545041 A | 3/2017 |
| JP | 2002-275935 A | 9/2002 |
| JP | 2007-2446 A | 1/2007 |
| JP | 4200985 B2 | 12/2008 |
| JP | 2015-17439 A | 1/2015 |

\* cited by examiner

1
WORK MACHINE

TECHNICAL FIELD

The present disclosure relates to a work machine.

BACKGROUND ART

A work machine including a work implement is known. For example, a hydraulic excavator disclosed in Japanese Patent Laying-Open No. 2007-2446 (PTL 1) includes: a work implement having a boom; left and right boom cylinders each configured to move the boom up and down; a control valve configured to control the flow rate and the direction of hydraulic oil; and a hydraulic pipe through which hydraulic oil flows between the control valve and each of the boom cylinders.

CITATION LIST

Patent Literature

PTL 1: Japanese Patent Laying-Open No. 2007-2446

SUMMARY OF INVENTION

Technical Problem

As disclosed in the above-mentioned PTL 1, a work implement operates with hydraulic oil supplied from a control valve. A work machine including such a work implement is required to reduce the pressure loss occurring in a pipe through which hydraulic oil is supplied to the work implement.

Thus, an object of the present disclosure is to provide a work machine that allows reduction in pressure loss on a pipe through which hydraulic oil is supplied to a work implement.

Solution to Problem

A work machine according to the present disclosure includes a revolving frame, a work implement, a control valve, and a first pipe. The work implement includes a first actuator and a second actuator. The control valve is provided above the revolving frame. Through the first pipe, hydraulic oil flows between the control valve and each of the first actuator and the second actuator. The first pipe includes a first conduit, a second conduit, a third conduit, and a first branch portion. The first conduit is connected to the control valve. The second conduit is connected to the first actuator. The third conduit is connected to the second actuator. At the first branch portion, the first conduit branches into the second conduit and the third conduit. In a top view, a first region is defined on one side with respect to a virtual straight line passing through a center of swing of the revolving frame, and a second region is defined on the other side with respect to the virtual straight line. In the first region, the work implement is disposed. In the second region, the control valve and the first branch portion are disposed.

Advantageous Effects of Invention

The present disclosure can provide a work machine that allows reduction in pressure loss on a pipe through which hydraulic oil is supplied to a work implement.

DESCRIPTION OF EMBODIMENTS

Figure 1:
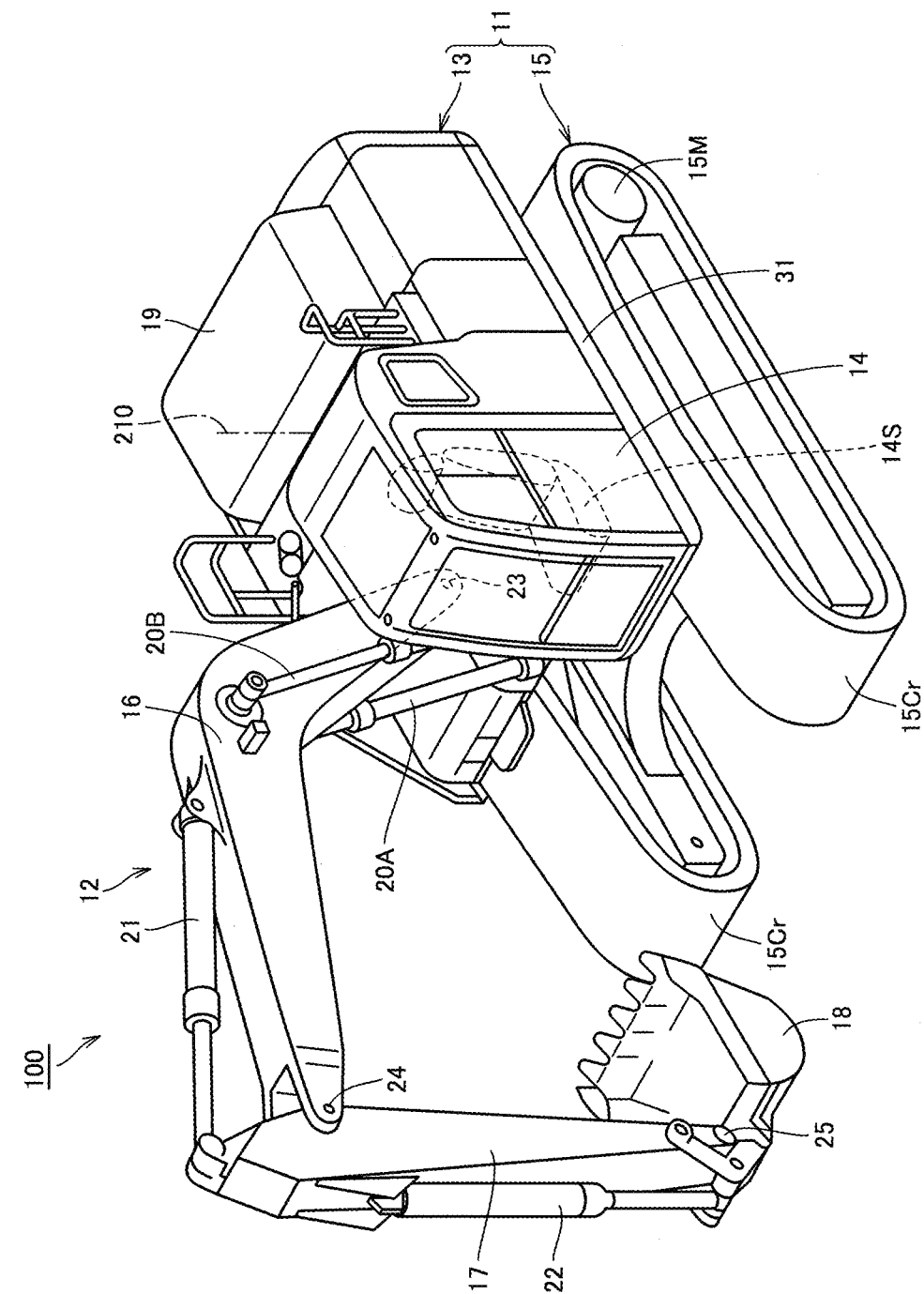
FIG. 1 is a perspective view showing a hydraulic excavator in the first embodiment of the present disclosure.

Embodiments of the present invention will be hereinafter described with reference to the accompanying drawings, in which the same or corresponding components are designated by the same reference characters.

First Embodiment

FIG. 1 is a perspective view showing a hydraulic excavator in the first embodiment of the present disclosure. As shown in FIG. 1, a hydraulic excavator 100 includes a main body 11 and a work implement 12 that operates with hydraulic pressure. Main body 11 includes a revolving unit 13 and a travelling device 15.

Travelling device 15 includes a pair of crawler belts 15Cr and a travel motor 15M. Hydraulic excavator 100 can travel by rotation of crawler belts 15Cr. Travel motor 15M is provided as a drive source of travelling device 15. Travel motor 15M is a hydraulic motor that operates with hydraulic pressure. Travelling device 15 may include a wheel (tire).

Revolving unit 13 is provided on travelling device 15 and supported by travelling device 15. Revolving unit 13 can swing about a center of swing 210 with respect to travelling device 15. Center of swing 210 corresponds to an axis extending in the up-down direction. Revolving unit 13 includes an operator's cab 14. Operator's cab 14 is provided with an operator's seat 14S on which an operator sits. The operator inside operator's cab 14 can operate hydraulic excavator 100.

Revolving unit 13 includes an engine compartment 19 and a counter weight that is provided in a rear portion of revolving unit 13. Engine compartment 19 is equipped with an engine 41 (described later), a hydraulic pump 42, a control valve 46, and the like.

Work implement 12 is supported by revolving unit 13. Work implement 12 includes a boom 16, an arm 17, and a bucket 18. Boom 16 is connected to revolving unit 13. Arm 17 is connected to boom 16. Bucket 18 is connected to arm 17.

Boom 16 has a proximal end connected to revolving unit 13 through a boom pin 23. Arm 17 has a proximal end connected to a distal end of boom 16 through an arm pin 24. Bucket 18 is connected to a distal end of arm 17 through a bucket pin 25.

Boom 16 is pivotable about boom pin 23. Arm 17 is pivotable about arm pin 24. Bucket 18 is pivotable about bucket pin 25.

A front-rear direction corresponds to the front-rear direction of an operator sitting on the operator's seat inside operator's cab 14. The direction in which the operator sitting on the operator's seat faces corresponds to the front direction. The direction rearward of the operator sitting on the operator's seat corresponds to the rear direction. With respect to the front-rear direction, the front direction can be defined as the direction in which work implement 12 protrudes from main body 11 of hydraulic excavator 100 while the rear direction can also be defined as the direction that is opposite to the front direction. Also, the right-left direction of hydraulic excavator 100 corresponds to the direction that is orthogonal to the front-rear direction in a top view.

Work implement 12 includes a first actuator 20A, a second actuator 20B, an actuator 21, and an actuator 22. First actuator 20A and second actuator 20B drive boom 16. Actuator 21 drives arm 17. Actuator 22 drives bucket 18. First actuator 20A, second actuator 20B, actuator 21, and actuator 22 each are a hydraulic cylinder that operates with hydraulic pressure.

Figure 2:
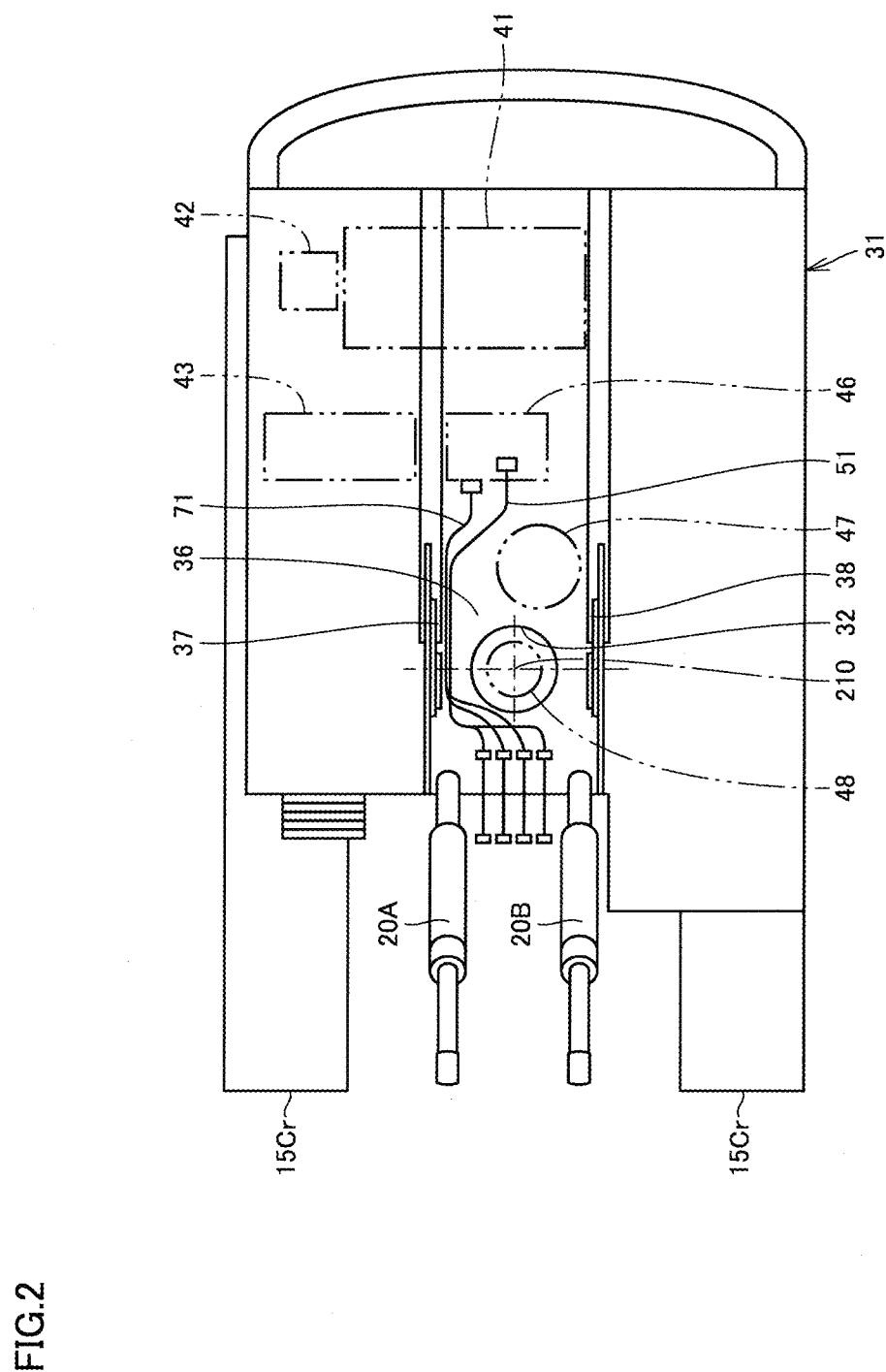
FIG. 2 is a top view showing various devices provided on a revolving frame of the hydraulic excavator.
Figure 3:
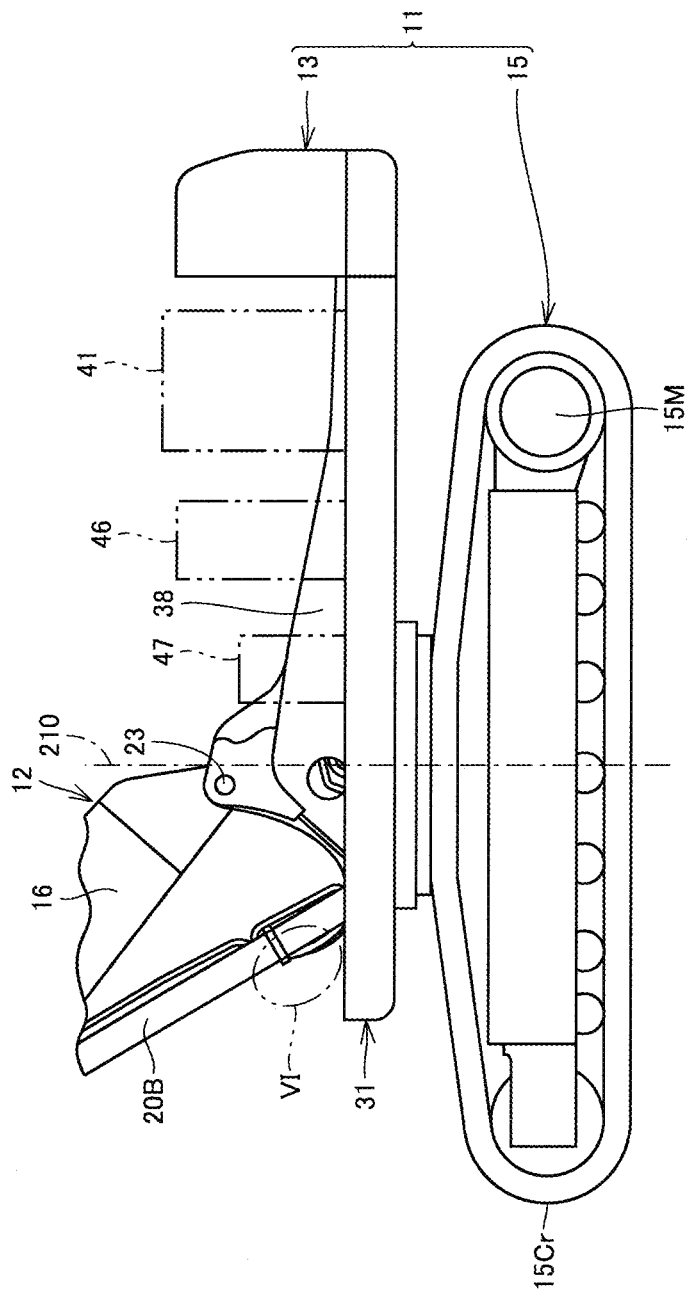
FIG. 3 is a side view showing various devices provided on the revolving frame of the hydraulic excavator.

FIG. 2 is a top view showing various devices provided on a revolving frame of the hydraulic excavator. FIG. 3 is a side view showing various devices provided on the revolving frame of the hydraulic excavator.

As shown in FIGS. 2 and 3, revolving unit 13 includes a revolving frame 31. Revolving frame 31 serves as a frame that forms a base of revolving unit 13 and is provided immediately above travelling device 15. Revolving frame 31 is capable of swinging about center of swing 210.

Revolving frame 31 is formed of components including a bottom plate portion 36, and a vertical plate 37 and a vertical plate 38. Bottom plate portion 36 has a flat plate shape that extends in a planar shape in the direction orthogonal to center of swing 210. Vertical plate 37 and vertical plate 38 are vertically arranged on bottom plate portion 36. Vertical plate 37 and vertical plate 38 face each other at a distance from each other in the right-left direction. Center of swing 210 is located between vertical plate 37 and vertical plate 38.

Revolving frame 31 is provided with an opening 32. Opening 32 penetrates through bottom plate portion 36. Opening 32 is provided to coincide with the axis of center of swing 210.

Hydraulic excavator 100 includes an engine 41, a hydraulic pump 42, a hydraulic oil tank 43, and control valve 46. Engine 41, hydraulic pump 42, hydraulic oil tank 43, and control valve 46 are provided above revolving frame 31.

Work implement 12 is located forward of center of swing 210 of revolving frame 31. Engine 41, hydraulic pump 42, hydraulic oil tank 43, and control valve 46 are located rearward of center of swing 210 of revolving frame 31. Control valve 46 is located between vertical plate 37 and vertical plate 38.

Hydraulic oil tank 43 stores hydraulic oil. Hydraulic pump 42 is coupled to engine 41. Hydraulic pump 42 operates with the motive power received from engine 41. When hydraulic pump 42 operates, the hydraulic oil inside hydraulic oil tank 43 is fed to control valve 46. A spool (not shown) is incorporated in control valve 46. Control valve 46 controls the flow rate and the direction of hydraulic oil as the spool moves in its axis direction. From control valve 46, hydraulic oil is supplied to a driving actuator of work implement 12, travel motor 15M, a slewing motor 47 (described later), and the like. The oil from each of various types of actuators and motors is returned to hydraulic oil tank 43 through an oil cooler (not shown).

Hydraulic excavator 100 includes a swivel joint 48. Swivel joint 48 is provided to coincide with the axis of center of swing 210 of revolving frame 31. Swivel joint 48 is located at opening 32. The top of swivel joint 48 protrudes through opening 32 above bottom plate portion 36. Swivel joint 48 serves as a rotary joint. Swivel joint 48 supports a hydraulic pipe and the like that connect control valve 46 and travel motor 15M.

Hydraulic excavator 100 includes slewing motor 47. Stewing motor 47 is located rearward of center of swing 210 of revolving frame 31. Slewing motor 47 is disposed between swivel joint 48 (center of swing 210) and control valve 46 in the front-rear direction. Slewing motor 47 is disposed between vertical plate 37 and vertical plate 38. Slewing motor 47 is disposed closer to vertical plate 37 than to vertical plate 38 in the right-left direction. Slewing motor 47 is provided as a drive source that causes revolving frame 31 to swivel. Slewing motor 47 serves as a hydraulic motor that operates with hydraulic pressure.

Figure 4:
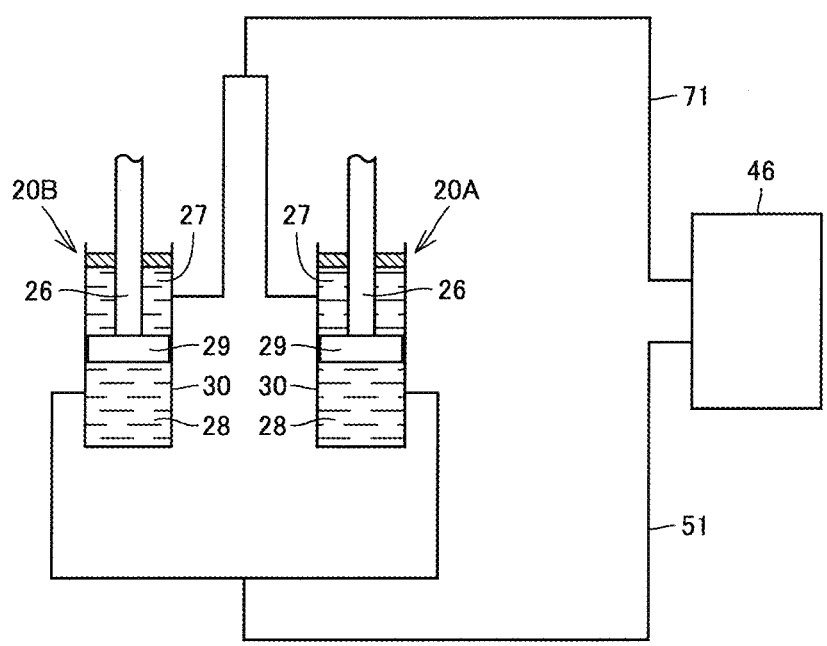
FIG. 4 is a diagram schematically showing a pipe that connects a driving actuator of a boom and a control valve.
Figure 5:
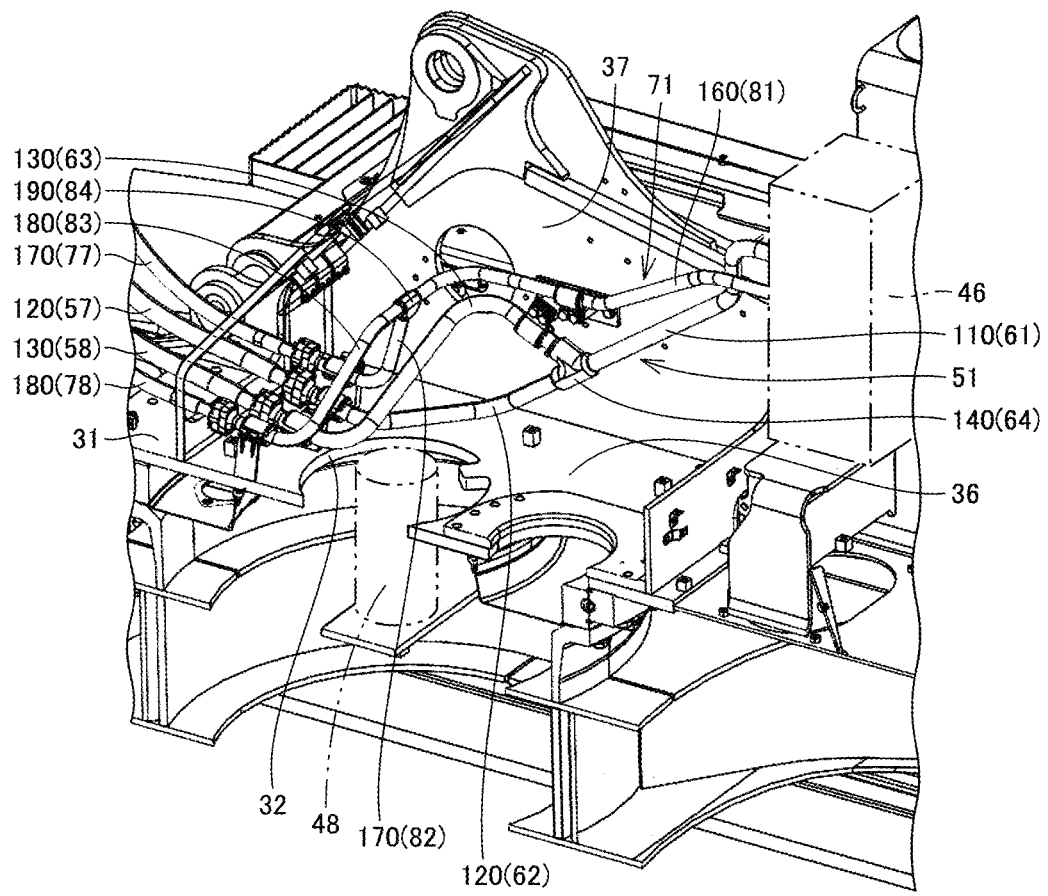
FIG. 5 is a perspective view showing the pipe that connects the driving actuator of the boom and the control valve.
Figure 6:
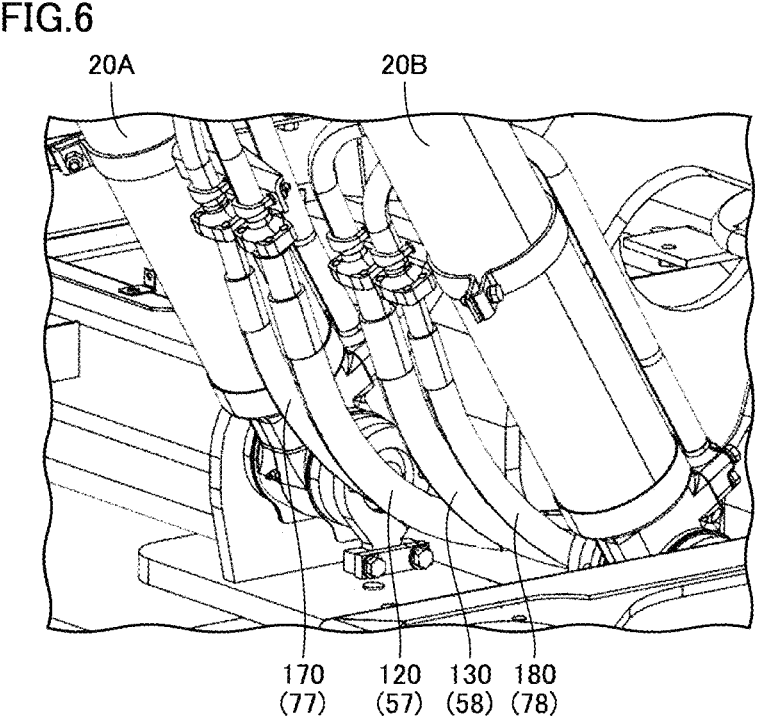
FIG. 6 is a perspective view showing the range surrounded by a two-dot chain line VI in FIG. 3.

FIG. 4 is a diagram schematically showing a pipe that connects a driving actuator of a boom and a control valve. FIG. 5 is a perspective view showing the pipe that connects the driving actuator of the boom and the control valve. FIG. 6 is a perspective view showing the range surrounded by a two-dot chain line VI in FIG. 3.

As shown in FIGS. 4 to 6, first actuator 20A and second actuator 20B are arranged side by side in the right-left direction on the proximal end side of boom 16. In hydraulic excavator 100, two actuators 20A and 20B synchronously operate, thereby operating boom 16 as a driven body.

Each of first actuator 20A and second actuator 20B includes a cylinder 30, a piston 29, and a piston rod 26.

Cylinder 30 is formed in a tubular shape having one end, at which cylinder 30 is rotatably connected to revolving frame 31. Piston 29 is fitted in cylinder 30 so as to be movable in the axis direction. Piston rod 26 extends from piston 29 in one direction along the axis direction of cylinder 30. At its extending end, piston rod 26 is rotatably connected to boom 16.

Each of first actuator 20A and second actuator 20B is provided with a rod-side hydraulic chamber 27 and a bottom-side hydraulic chamber 28. Rod-side hydraulic chamber 27 and bottom-side hydraulic chamber 28 each are a sealed space to which hydraulic oil is supplied from control valve 46. Rod-side hydraulic chamber 27 and bottom-side hydraulic chamber 28 are disposed with piston 29 interposed therebetween. Piston rod 26 is disposed in rod-side hydraulic chamber 27. Rod-side hydraulic chamber 27 is provided between the inner circumferential surface of cylinder 30 and the outer circumferential surface of piston rod 26 in the radial direction of cylinder 30. Piston rod 26 is not disposed in bottom-side hydraulic chamber 28. Bottom-side hydraulic chamber 28 is provided inside the inner circumferential surface of cylinder 30 in the radial direction of cylinder 30.

Hydraulic excavator 100 includes a first pipe 51 and a second pipe 71. Through first pipe 51, hydraulic oil flows between control valve 46 and each of first actuator 20A and second actuator 20B. Through first pipe 51, hydraulic oil flows between control valve 46 and each of bottom-side hydraulic chamber 28 of first actuator 20A and bottom-side hydraulic chamber 28 of second actuator 20B. Through second pipe 71 that is independent of first pipe 51, hydraulic oil flows between control valve 46 and each of first actuator 20A and second actuator 20B. Through second pipe 71, hydraulic oil flows between control valve 46 and each of rod-side hydraulic chamber 27 of first actuator 20A and rod-side hydraulic chamber 27 of second actuator 20B.

Figure 7:
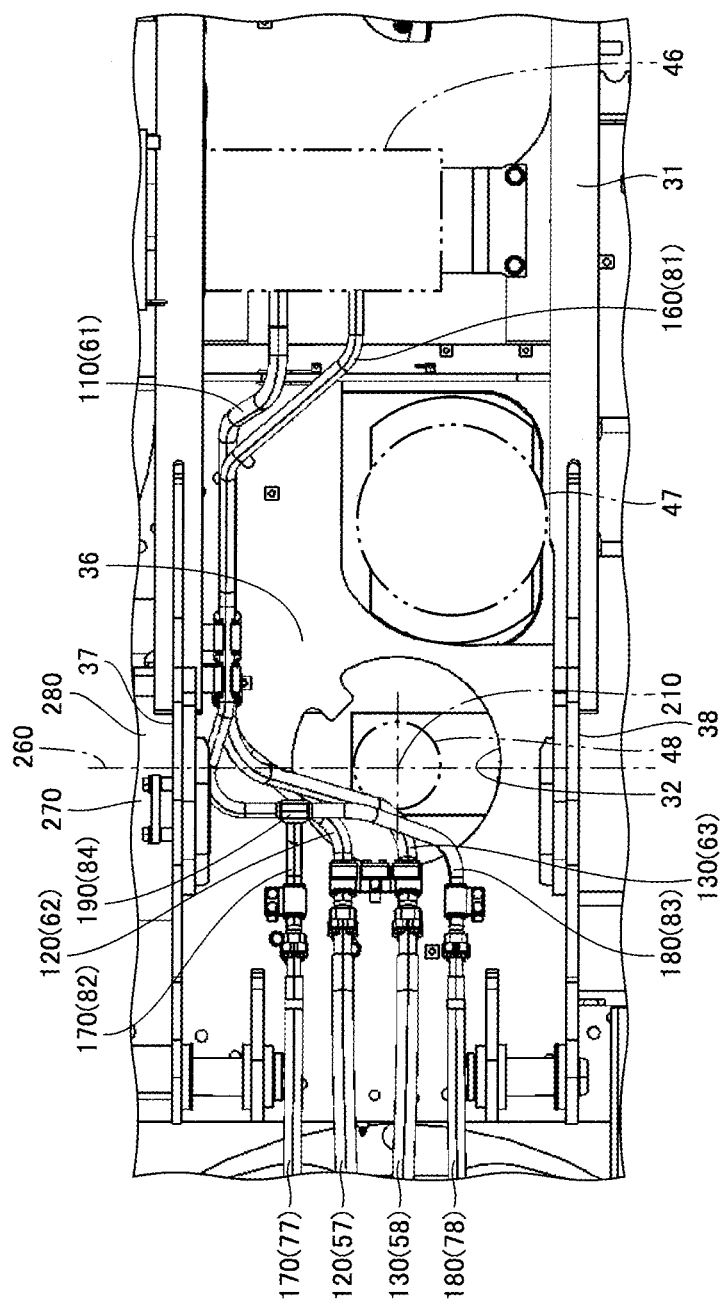
FIG. 7 is a top view showing the pipe that connects the driving actuator of the boom and the control valve.
Figure 8:
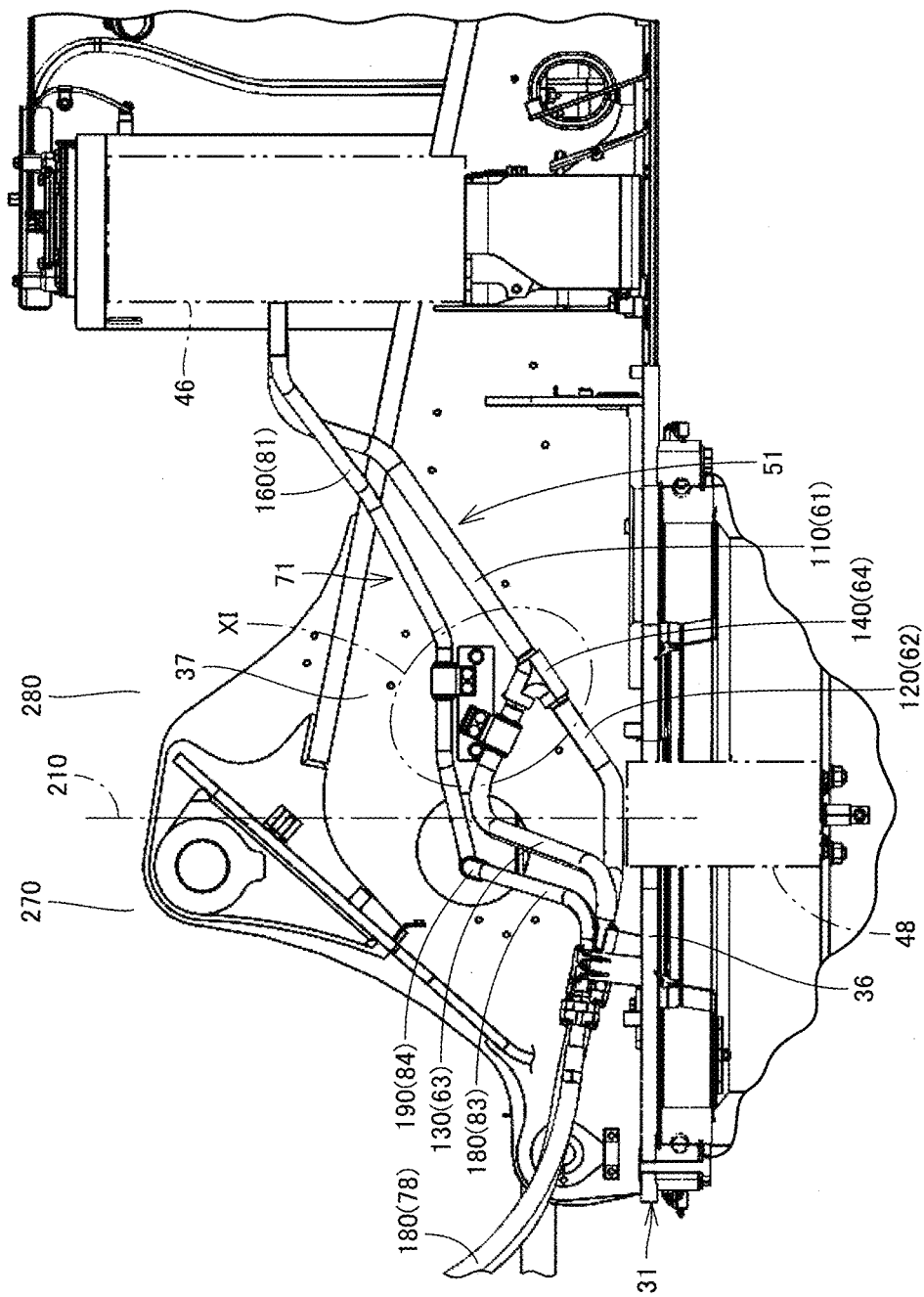
FIG. 8 is a side view showing the pipe that connects the driving actuator of the boom and the control valve.
Figure 9:
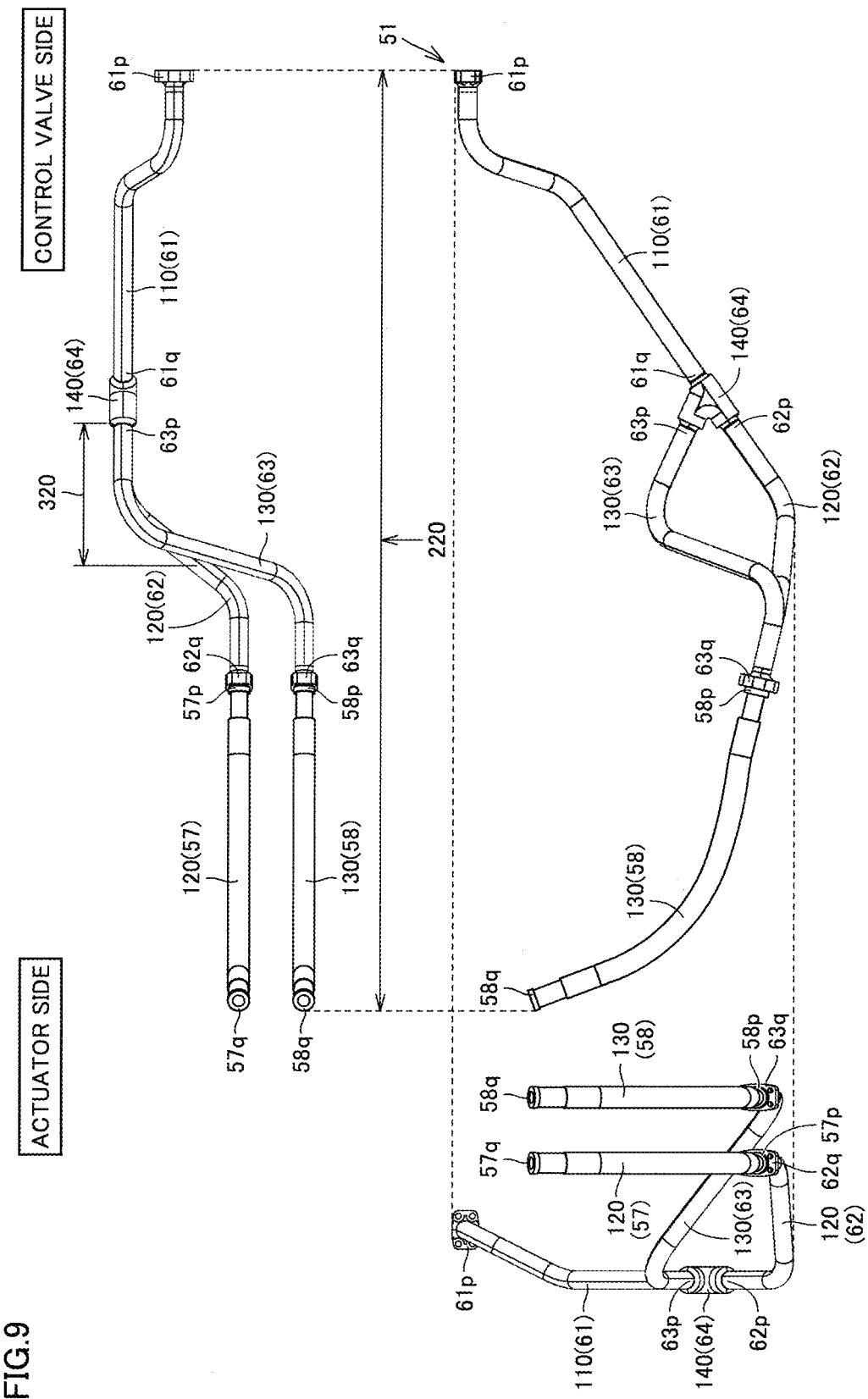
FIG. 9 is a top view, a side view and a front view showing a first pipe.

FIG. 7 is a top view showing the pipe that connects the driving actuator of the boom and the control valve. FIG. 8 is a side view showing the pipe that connects the driving actuator of the boom and the control valve. FIG. 9 is a top view, a side view and a front view showing the first pipe.

The structure of first pipe 51 will be hereinafter described. As shown in FIGS. 5 to 9, first pipe 51 includes a first conduit 110, a second conduit 120, a third conduit 130, and a first branch portion 140.

First conduit 110 is connected to control valve 46. Second conduit 120 is connected to first actuator 20A. Second conduit 120 is connected to bottom-side hydraulic chamber 28 of first actuator 20A. Third conduit 130 is connected to second actuator 20B. Third conduit 130 is connected to bottom-side hydraulic chamber 28 of second actuator 20B. First branch portion 140 is provided between first conduit 110 and each of second conduit 120 and third conduit 130. At first branch portion 140, first conduit 110 branches into second conduit 120 and third conduit 130.

The sum of the cross-sectional area of the flow passage of hydraulic oil in second conduit 120 and the cross-sectional area of the flow passage of hydraulic oil in third conduit 130 is larger than the cross-sectional area of the flow passage of hydraulic oil in first conduit 110.

When first actuator 20A and second actuator 20B are driven to expand, the hydraulic oil from control valve 46 flows through first conduit 110 toward first branch portion 140. The hydraulic oil is branched from first branch portion 140 into second conduit 120 and third conduit 130, then supplied through second conduit 120 into bottom-side hydraulic chamber 28 of first actuator 20A, and supplied through third conduit 130 into bottom-side hydraulic chamber 28 of second actuator 20B. When first actuator 20A and second actuator 20B are driven to contract, the hydraulic oil from bottom-side hydraulic chamber 28 of first actuator 20A and the hydraulic oil from bottom-side hydraulic chamber 28 of second actuator 20B flow through second conduit 120 and third conduit 130, respectively, and merge with each other at first branch portion 140. The hydraulic oil returns to control valve 46 through first conduit 110.

The pipe components constituting first pipe 51 will be hereinafter described. First pipe 51 is formed of a steel pipe 61, a three-way pipe joint 64, a steel pipe 62, a steel pipe 63, a hydraulic hose 57, and a hydraulic hose 58. Hydraulic hose 57 and hydraulic hose 58 each have flexibility.

In each of the pipe components, the end on the control valve 46 side will be referred to as "one end" while the end on the first actuator 20A and second actuator 20B sides will be referred to as "the other end". As shown in FIG. 9, one end 61p of steel pipe 61 is connected to control valve 46. The other end 61q of steel pipe 61, one end 62p of steel pipe 62, and one end 63p of steel pipe 63 are connected to three-way pipe joint 64. The other end 62q of steel pipe 62 is connected to one end 57p of hydraulic hose 57. The other end 63q of steel pipe 63 is connected to one end 58p of hydraulic hose 58. The other end 57q of hydraulic hose 57 is connected to bottom-side hydraulic chamber 28 of first actuator 20A. The other end 58q of hydraulic hose 58 is connected to bottom-side hydraulic chamber 28 of second actuator 20B.

In the configuration as described above, steel pipe 61 constitutes first conduit 110. Three-way pipe joint 64 constitutes first branch portion 140. Steel pipe 62 and hydraulic hose 57 constitute second conduit 120. Steel pipe 63 and hydraulic hose 58 constitute third conduit 130.

Steel pipe 61, steel pipe 62, and steel pipe 63 are identical in cross-sectional area of the flow passage of the hydraulic oil. Hydraulic hose 57 and hydraulic hose 58 are identical in cross-sectional area of the flow passage of the hydraulic oil. The sum of the cross-sectional area of the flow passage of the hydraulic oil at an arbitrary position in steel pipe 62 and hydraulic hose 57 (second conduit 120) and the cross-sectional area of the flow passage of the hydraulic oil at an arbitrary position in steel pipe 63 and hydraulic hose 58 (third conduit 130) is larger than the cross-sectional area of the flow passage of the hydraulic oil at an arbitrary position in steel pipe 61 (first conduit 110).

In a top view of hydraulic excavator 100, a first region 270 is defined on one side with respect to a virtual straight line 260 passing through center of swing 210 of revolving frame 31 while a second region 280 is defined on the other side with respect to virtual straight line 260 passing through center of swing 210 of revolving frame 31. In first region 270, work implement 12 is disposed. In second region 280, control valve 46 and first branch portion 140 (three-way pipe joint 64) are disposed.

Virtual straight line 260 is an arbitrary straight line that passes through center of swing 210 of revolving frame 31, and that can define first region 270 in which work implement 12 is disposed, and second region 280 in which control valve 46 and first branch portion 140 are disposed. In the present embodiment, virtual straight line 260 passes through center of swing 210 of revolving frame 31 and extends in the right-left direction. First region 270 is located forward of center of swing 210 of revolving frame 31. Second region 280 is located rearward of center of swing 210 of revolving frame 31.

In the present disclosure, the work implement is divided from each of the control valve and the first branch portion on the sides opposite to each other by the virtual straight line that is not limited to the above-mentioned virtual straight line extending in the right-left direction, but for example may be a virtual straight line extending from the diagonally right forward side toward the diagonally left rearward side, or may be a virtual straight line extending from the diagonally left forward side toward the diagonally right rearward side.

First branch portion 140 is disposed rearward of center of swing 210 of revolving frame 31. First branch portion 140 is disposed between center of swing 210 of revolving frame 31 and control valve 46 in the front-rear direction.

First branch portion 140 is disposed rearward of swivel joint 48. First branch portion 140 is provided closer to control valve 46 with respect to the center position of first pipe 51 in the front-rear direction (a center position 220 shown in FIG. 9) between control valve 46 and each of first actuator 20A and second actuator 20B. Center position 220 of first pipe 51 is located forward of center of swing 210 of revolving frame 31. Alternatively, center position 220 of first pipe 51 may be located rearward of center of swing 210 of revolving frame 31.

As the cross-sectional area of the flow passage of hydraulic oil in first pipe 51 is smaller, the pressure loss becomes larger. Thus, first branch portion 140 is disposed on the same side as control valve 46 with respect to virtual straight line 260 passing through center of swing 210 of revolving frame 31. Thereby, first conduit 110 can be designed to be shorter while second conduit 120 and third conduit 130 branched from first conduit 110 can be designed to be longer. In this case, the sum of the cross-sectional area of the flow passage of the hydraulic oil in second conduit 120 and the cross-sectional area of the flow passage of the hydraulic oil in third conduit 130 is larger than the cross-sectional area of the flow passage of the hydraulic oil in first conduit 110. Accordingly, by disposing first branch portion 140 on the same side as control valve 46 with respect to virtual straight line 260, the section having a relatively large cross-sectional area in first pipe 51 can be increased. Thereby, pressure loss can be reduced.

Furthermore, the hydraulic oil serving to actuate each of two actuators including first actuator 20A and second actuator 20B flows into and out of control valve 46 through first conduit 110. Thereby, the pressure loss occurring when the hydraulic oil flows through first conduit 110 is increased. In contrast, by disposing first branch portion 140 on the same side as control valve 46 with respect to virtual straight line 260 passing through center of swing 210 of revolving frame 31, first conduit 110 can be designed to be further shorter. This consequently can reduce the pressure loss occurring when the hydraulic oil flows through first conduit 110.

In the present embodiment, the relation of magnitude between the length of first conduit 110 and the length of each of second conduit 120 and third conduit 130 is not particularly limited. The length of first conduit 110 may be equal to or shorter than the length of each of second conduit 120 and third conduit 130, or may be longer than the length of each of second conduit 120 and third conduit 130.

In each of first actuator 20A and second actuator 20B, piston rod 26 is disposed in rod-side hydraulic chamber 27, but piston rod 26 is not disposed in bottom-side hydraulic chamber 28. Accordingly, the amount of hydraulic oil required for piston 29 to move in a certain length of stroke is greater in bottom-side hydraulic chamber 28 than in rod-side hydraulic chamber 27. Thereby, the pressure loss of hydraulic oil is more significant in first pipe 51 through which hydraulic oil flows into and out of bottom-side hydraulic chamber 28 than in second pipe 71 through which hydraulic oil flows into and out of rod-side hydraulic chamber 27. Thus, in first pipe 51, first branch portion 140 is disposed rearward of center of swing 210 of revolving frame 31, so that the effect of reducing the pressure loss can be more effectively achieved.

Figure 10:
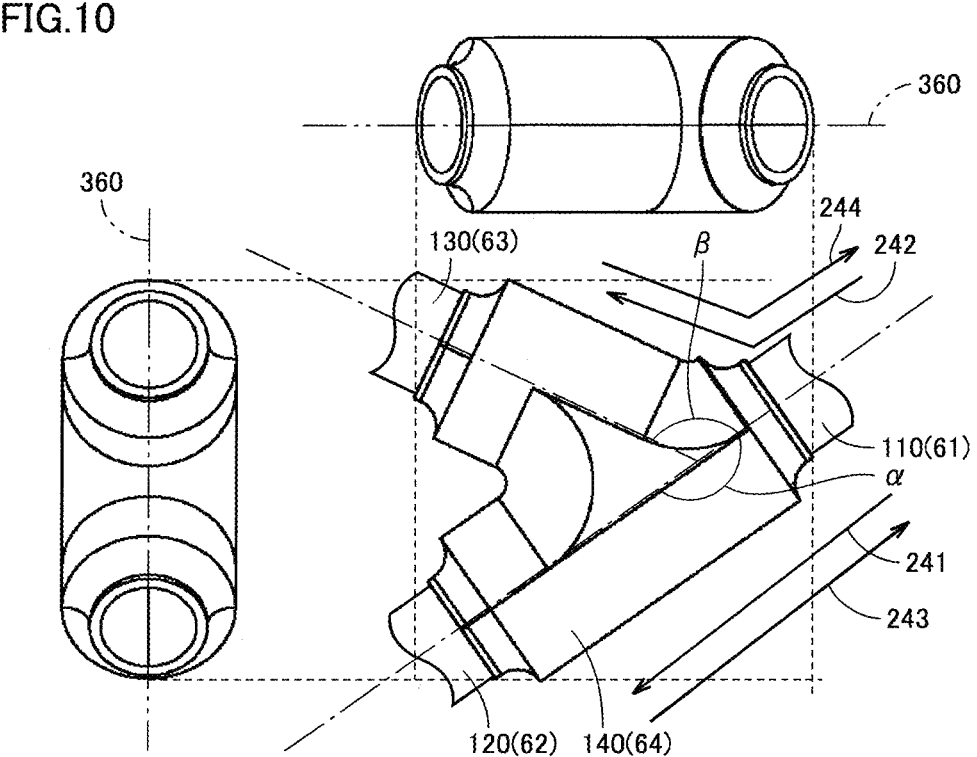
FIG. 10 is a side view showing the flow of hydraulic oil in a first branch portion.

FIG. 10 is a side view showing the flow of hydraulic oil in the first branch portion. As shown in FIG. 10, the flow of the hydraulic oil from first conduit 110 toward second conduit 120 is indicated by an arrow 241 while the flow of the hydraulic oil from first conduit 110 toward third conduit 130 is indicated by an arrow 242. Also, the flow of the hydraulic oil from second conduit 120 toward first conduit 110 is indicated by an arrow 243 while the flow of the hydraulic oil from third conduit 130 toward first conduit 110 is indicated by an arrow 244.

In first branch portion 140, first conduit 110 and second conduit 120 form a branch angle $\alpha$ that is greater than 90° and equal to or less than 180° ($90° < \alpha \leq 180°$). In first branch portion 140, first conduit 110 and third conduit 130 form a branch angle $\beta$ that is greater than 90° and equal to or less than 180° ($90° < \beta \leq 180°$).

Branch angle $\alpha$ is an angle representing a change in the direction of the hydraulic oil that flows through first conduit 110 and second conduit 120 before and after first branch portion 140. Branch angle $\beta$ is an angle representing a change in the direction of the hydraulic oil that flows through first conduit 110 and third conduit 130 before and after first branch portion 140.

According to the configuration as described above, the flow of the hydraulic oil that branches off and merges in first branch portion 140 is further smoothened, so that the pressure loss can be further reduced.

Furthermore, in first branch portion 140, first conduit 110 and second conduit 120 form branch angle $\alpha$ of 180° ($\alpha = 180°$). In first branch portion 140, first conduit 110 and third conduit 130 form an obtuse branch angle $\beta$ ($90° < \beta < 180°$).

According to the configuration as described above, the pressure loss of the hydraulic oil flowing between first conduit 110 and second conduit 120 in first branch portion 140 can be more effectively reduced.

Then, the structure of second pipe 71 will be hereinafter described. As shown in FIGS. 5 to 8, second pipe 71 includes a fourth conduit 160, a fifth conduit 170, a sixth conduit 180, and a second branch portion 190.

Fourth conduit 160 is connected to control valve 46. Fifth conduit 170 is connected to first actuator 20A. Fifth conduit 170 is connected to rod-side hydraulic chamber 27 of first actuator 20A. Sixth conduit 180 is connected to second actuator 20B. Sixth conduit 180 is connected to rod-side hydraulic chamber 27 of second actuator 20B. Second branch portion 190 is provided between fourth conduit 160 and each of fifth conduit 170 and sixth conduit 180. At second branch portion 190, fourth conduit 160 branches into fifth conduit 170 and sixth conduit 180.

When first actuator 20A and second actuator 20B are driven to contract, the hydraulic oil from control valve 46 flows through fourth conduit 160 toward second branch portion 190. The hydraulic oil branches from second branch portion 190 into fifth conduit 170 and sixth conduit 180, then is supplied through fifth conduit 170 into rod-side hydraulic chamber 27 of first actuator 20A, and supplied through sixth conduit 180 into rod-side hydraulic chamber 27 of second actuator 20B. When first actuator 20A and second actuator 20B are driven to expand, the hydraulic oil from rod-side hydraulic chamber 27 of first actuator 20A and the hydraulic oil from rod-side hydraulic chamber 27 of second actuator 20B flow through fifth conduit 170 and sixth conduit 180, respectively, and merge with each other in second branch portion 190. The hydraulic oil returns to control valve 46 through fourth conduit 160.

The pipe components constituting second pipe 71 will be hereinafter described. Second pipe 71 is formed of a steel pipe 81, a three-way pipe joint 84, a steel pipe 82, a steel pipe 83, a hydraulic hose 77, and a hydraulic hose 78. Hydraulic hose 77 and hydraulic hose 78 each have flexibility.

One end of steel pipe 81 is connected to control valve 46. The other end of steel pipe 81, one end of steel pipe 82, and one end of steel pipe 83 are connected to three-way pipe joint 84. The other end of steel pipe 82 is connected to one end of hydraulic hose 77. The other end of steel pipe 83 is connected to one end of hydraulic hose 78. The other end of hydraulic hose 77 is connected to rod-side hydraulic chamber 27 of first actuator 20A. The other end of hydraulic hose 78 is connected to rod-side hydraulic chamber 27 of second actuator 20B.

In the configuration as described above, steel pipe 81 constitutes fourth conduit 160. Three-way pipe joint 84 constitutes second branch portion 190. Steel pipe 82 and hydraulic hose 77 constitute fifth conduit 170. Steel pipe 83 and hydraulic hose 78 constitute sixth conduit 180.

Second branch portion 190 (three-way pipe joint 84) is disposed together with work implement 12 in first region 270. Second branch portion 190 is disposed forward of center of swing 210 of revolving frame 31.

The following is an explanation about a path along which first pipe 51 and second pipe 71 are routed.

As shown in FIGS. 5 to 9, steel pipe 61, steel pipe 62 and steel pipe 63 that constitute first pipe 51 are provided above revolving frame 31. Hydraulic hose 57 constituting first pipe 51 is routed between revolving frame 31 and first actuator 20A. Hydraulic hose 58 constituting first pipe 51 is routed between revolving frame 31 and second actuator 20B.

Steel pipe 61 extends forward from control valve 46 and also extends diagonally downward so as to approach vertical plate 37. Steel pipe 61 extends diagonally downward in parallel with vertical plate 37 and reaches three-way pipe joint 64.

Steel pipe 62 extends forward from three-way pipe joint 64 and extends diagonally downward along vertical plate 37. After steel pipe 62 reaches the lowest height of steel pipe 62, it extends diagonally upward in the forward direction while increasing the distance from vertical plate 37. Then, steel pipe 62 changes its extending direction into the direction in parallel with vertical plate 37 to extend diagonally upward in the forward direction, and then reaches hydraulic hose 57. Steel pipe 62 is provided so as to pass through center of swing 210 of revolving frame 31 in the front-rear direction.

Steel pipe 63 extends forward from three-way pipe joint 64 and extends diagonally upward along vertical plate 37. After steel pipe 63 reaches the maximum height of steel pipe 63, it extends diagonally downward in the forward direction while increasing the distance from vertical plate 37. Then, steel pipe 63 changes its extending direction into the direction in parallel with vertical plate 37 to extend diagonally upward in the forward direction, and then reaches hydraulic hose 58. Steel pipe 63 is provided so as to pass through center of swing 210 of revolving frame 31 in the front-rear direction.

Three-way pipe joint 64 is located at a position higher than the other end 62q of steel pipe 62 and the other end 63q of steel pipe 63. One end 61p of steel pipe 61 is located at a position higher than three-way pipe joint 64. The distance from vertical plate 37 to three-way pipe joint 64 in the right-left direction is shorter than the distance from vertical plate 37 to one end 61p of steel pipe 61 in the right-left direction, and shorter than the distance from vertical plate 37 to each of the other end 62q of steel pipe 62 and the other end 63q of steel pipe 63 in the right-left direction. In order to avoid interference with swivel joint 48, slewing motor 47 and the like, steel pipe 61, steel pipe 62 and steel pipe 63 as a whole extend diagonally downward from control valve 46 toward hydraulic hoses 57 and 58 while extending through a bypass path along vertical plate 37.

Hydraulic hose 57 extends forward from steel pipe 62. Hydraulic hose 57 extends diagonally upward and reaches first actuator 20A. Hydraulic hose 58 extends forward from steel pipe 63. Hydraulic hose 58 extends diagonally upward and reaches second actuator 20B. Hydraulic hose 58 is provided side by side with hydraulic hose 57 in the right-left direction.

As shown in FIGS. 5 to 8, steel pipe 81, steel pipe 82 and steel pipe 83 constituting second pipe 71 are provided above revolving frame 31. Hydraulic hose 77 constituting second pipe 71 is routed between revolving frame 31 and first actuator 20A. Hydraulic hose 78 constituting second pipe 71 is routed between revolving frame 31 and second actuator 20B.

Steel pipe 81 extends forward from control valve 46 and extends diagonally downward so as to approach vertical plate 37. Steel pipe 81 extends diagonally downward along vertical plate 37 while steel pipe 81 is located above steel pipe 61, steel pipe 62 and steel pipe 63 of first pipe 51. Steel pipe 81 extends in the direction away from vertical plate 37 and reaches three-way pipe joint 84.

Steel pipe 82 extends forward from three-way pipe joint 84 and reaches hydraulic hose 77. Steel pipe 83 extends from three-way pipe joint 84 in the direction away from vertical plate 37. Steel pipe 83 changes its extending direction into the direction in parallel with vertical plate 37 to extend forward, and reaches hydraulic hose 78.

In order to avoid interference with swivel joint 48, slewing motor 47 and the like, steel pipe 81, steel pipe 82 and steel pipe 83 as a whole extend diagonally downward from control valve 46 toward hydraulic hoses 77 and 78 while extending through a bypass path along vertical plate 37.

Hydraulic hose 77 extends forward from steel pipe 82. Hydraulic hose 77 extends diagonally upward and reaches first actuator 20A. Hydraulic hose 78 extends forward from steel pipe 83. Hydraulic hose 78 extends diagonally upward and reaches second actuator 20B. Hydraulic hose 78 is provided side by side with hydraulic hose 77 in the right-left direction. Hydraulic hoses 77 and 78 are provided side by side with hydraulic hoses 57 and 58 in the right-left direction.

Figure 11:
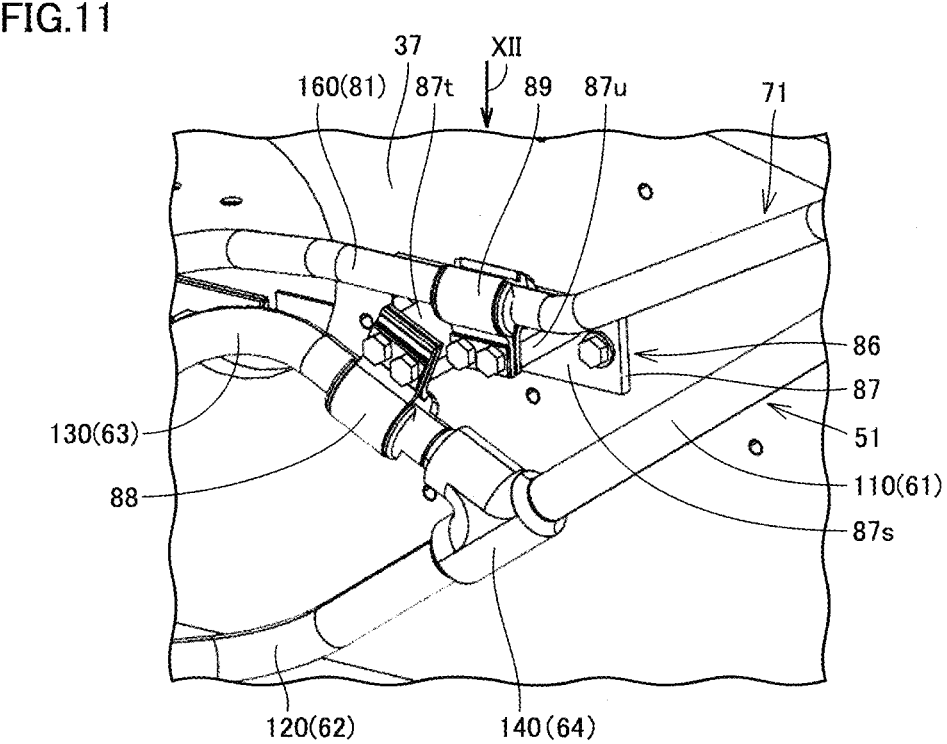
FIG. 11 is an enlarged perspective view showing the range surrounded by a two-dot chain line XI in FIG. 8.
Figure 12:
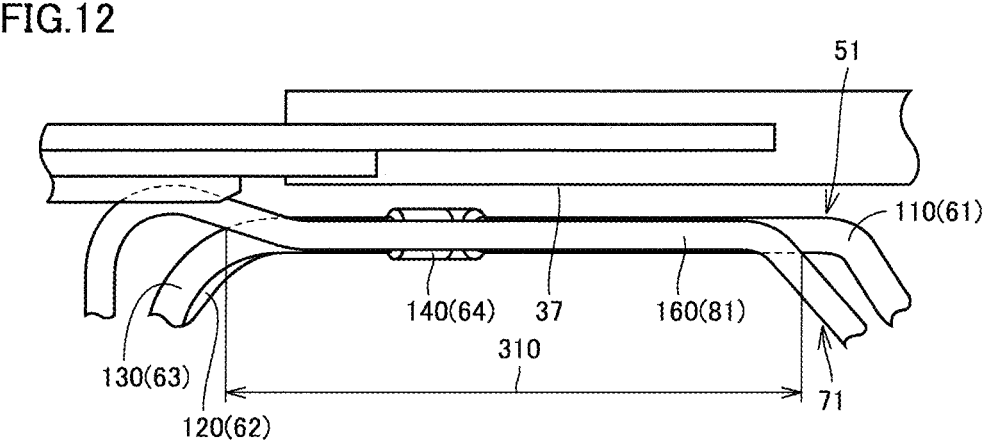
FIG. 12 is a top view showing a first pipe and a second pipe that are seen from the direction indicated by an arrow XII in FIG. 11.

FIG. 11 is an enlarged perspective view showing the range surrounded by a two-dot chain line XI in FIG. 8. FIG. 12 is a top view showing the first pipe and the second pipe that are seen from the direction indicated by an arrow XII in FIG. 11. FIG. 12 does not show a holder 86 shown in FIG. 11.

As shown in FIGS. 11 and 12, first pipe 51 and second pipe 71 have a first section 310 in which first pipe 51 and second pipe 71 extend to overlap with each other in a top view. First branch portion 140 (three-way pipe joint 64) is provided in first section 310.

In first section 310, second pipe 71 is located above first pipe 51. In first section 310, fourth conduit 160 (steel pipe 81) is located above first conduit 110 (steel pipe 61), second conduit 120 (steel pipe 62), and third conduit 130 (steel pipe 63). In first section 310, first pipe 51 and second pipe 71 are provided along vertical plate 37.

In first section 310, first pipe 51 may also be located above second pipe 71. Furthermore, in first section 310, one of second conduit 120 (steel pipe 62) and third conduit 130 (steel pipe 63) of first pipe 51 may overlap with fourth conduit 160 (steel pipe 81) of second pipe 71 in a top view.

The present disclosure may provide a configuration in which the first pipe and the second pipe extend to partially overlap with each other in the first section. The configuration in which the first pipe and the second pipe merely intersect with each other in a top view does not correspond to the first section.

When first branch portion 140 (three-way pipe joint 64) is disposed rearward of center of swing 210 of revolving frame 31, a larger number of pipes needs to be routed in a space around the devices such as slewing motor 47 disposed above revolving frame 31. In contrast, by providing first pipe 51 and second pipe 71 with first section 310 in which first pipe 51 and second pipe 71 extend to overlap with each other in a top view, first pipe 51 and second pipe 71 can be routed while effectively utilizing the space above revolving frame 31. Furthermore, by providing first section 310 with first branch portion 140 (three-way pipe joint 64) in which first conduit 110, second conduit 120 and third conduit 130 intersect with one another, the space above revolving frame 31 can be more effectively utilized.

As shown in FIGS. 9 to 11, second conduit 120 and third conduit 130 have a second section 320 in which second conduit 120 and third conduit 130 extend from first branch portion 140 to overlap with each other in a top view.

In second section 320, third conduit 130 (steel pipe 63) is located above second conduit 120 (steel pipe 62). At first branch portion 140 (three-way pipe joint 64), first conduit 110 branches into second conduit 120 and third conduit 130 inside a vertical plane 360 in FIG. 10.

By the configuration as described above, first pipe 51 can be routed while further more effectively utilizing the space above revolving frame 31.

Also, without being limited to the above-described configuration, first pipe 51 and second pipe 71 may be disposed side by side in the horizontal direction, or second conduit 120 and third conduit 130 of first pipe 51 may be disposed side by side in the horizontal direction. In this case, the height direction dimension of the space in which first pipe 51 and second pipe 71 are routed can be suppressed.

As shown in FIGS. 11 and 12, hydraulic excavator 100 is provided with a holder 86 for holding first pipe 51 and second pipe 71. Holder 86 includes a base portion 87, a first holding portion 88 and a second holding portion 89.

Base portion 87 is fixed to vertical plate 37 of revolving frame 31. Base portion 87 is formed of components including a plate-shaped portion 87s, a first pillar-shaped portion 87t and a second pillar-shaped portion 87u. Plate-shaped portion 87s is fastened with a bolt to vertical plate 37 of revolving frame 31. First pillar-shaped portion 87t and second pillar-shaped portion 87u are vertically arranged on plate-shaped portion 87s. First pillar-shaped portion 87t and second pillar-shaped portion 87u extend in a pillar-shape in the direction away from vertical plate 37.

First holding portion 88 and second holding portion 89 are provided in base portion 87. First holding portion 88 and second holding portion 89 are attached to first pillar-shaped portion 87t and second pillar-shaped portion 87u, respectively, with bolts. First holding portion 88 and second holding portion 89 hold first pipe 51 and second pipe 71, respectively. First holding portion 88 and second holding portion 89 each are formed of a clamp member capable of holding a pipe.

First holding portion 88 and second holding portion 89 hold first pipe 51 and second pipe 71, respectively, in first section 310. First holding portion 88 holds third conduit 130 (steel pipe 63) of first pipe 51. Second holding portion 89 holds fourth conduit 160 (steel pipe 81) of second pipe 71.

According to the configuration as described above, first pipe 51 and second pipe 71 can be held in a simple and inexpensive configuration using holder 86 formed as a single component.

Without being limited to the above-described configuration, for example, a holder may be provided to hold the first conduit (steel pipe 61) of first pipe 51 and fourth conduit 160 (steel pipe 81) of second pipe 71.

Figure 13:
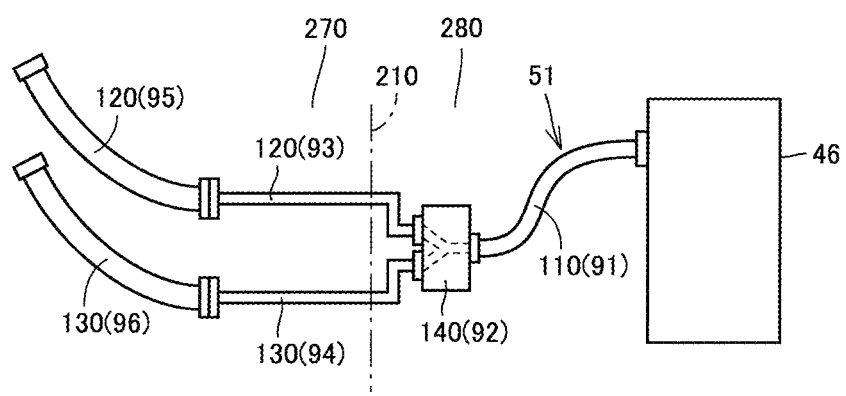
FIG. 13 is a diagram schematically showing a modification of pipe components constituting the first pipe shown in FIG. 8.

Then, a modification of the pipe components constituting first pipe 51 will be hereinafter described. FIG. 13 is a diagram schematically showing a modification of pipe components constituting the first pipe shown in FIG. 8. As shown in FIG. 13, in the present modification, first pipe 51 is formed of a hydraulic hose 91, a branch block 92, a steel pipe 93, a steel pipe 94, a hydraulic hose 95, and a hydraulic hose 96.

One end of hydraulic hose 91 is connected to control valve 46. The other end of hydraulic hose 91 is connected to branch block 92. One ends of steel pipe 93 and steel pipe 94 are connected to branch block 92. Branch block 92 is provided with an oil passage at which the oil passage from hydraulic hose 91 branches into oil passages leading to steel pipe 93 and steel pipe 94. The other ends of steel pipe 93 and steel pipe 94 are connected to one ends of hydraulic hose 95 and hydraulic hose 96, respectively. The other ends of hydraulic hose 95 and hydraulic hose 96 are connected to first actuator 20A and second actuator 20B, respectively.

In the configuration as described above, hydraulic hose 91 constitutes first conduit 110. Branch block 92 constitutes first branch portion 140. Steel pipe 93 and hydraulic hose 95 constitute second conduit 120. Steel pipe 94 and hydraulic hose 96 constitute third conduit 130. First branch portion 140 (branch block 92) is disposed together with control valve 46 in second region 280.

As shown in the present modification, the pipe components constituting the first pipe in the present disclosure are not particularly limited. The first pipe may also include pipe components such as a steel pipe, a resin-made pipe, a hose, a joint, a connector, and a block.

The following is a collective explanation about the configuration and the effect of hydraulic excavator 100 as a work machine in the first embodiment of the present disclosure as described above. Hydraulic excavator 100 in the first embodiment of the present disclosure includes revolving frame 31, work implement 12, control valve 46, and first pipe 51. Work implement 12 includes first actuator 20A and second actuator 20B. Control valve 46 is provided above revolving frame 31. Through first pipe 51, hydraulic oil flows between control valve 46 and each of first actuator 20A and second actuator 20B. First pipe 51 includes first conduit 110, second conduit 120, third conduit 130, and first branch portion 140. First conduit 110 is connected to control valve 46. Second conduit 120 is connected to first actuator 20A. Third conduit 130 is connected to second actuator 20B. At first branch portion 140, first conduit 110 branches into second conduit 120 and third conduit 130. In a top view, first region 270 is defined on one side with respect to virtual straight line 260 passing through center of swing 210 of revolving frame 31 while second region 280 is defined on the other side with respect to virtual straight line 260. In first region 270, work implement 12 is disposed. In second region 280, control valve 46 and first branch portion 140 are disposed.

According to hydraulic excavator 100 configured in this way, first branch portion 140 is disposed on the same side as control valve 46 with respect to virtual straight line 260 passing through center of swing 210 of revolving frame 31. Accordingly, the pressure loss in first pipe 51 can be reduced. Thereby, the energy efficiency during driving of work implement 12 (boom 16) can be increased, so that the fuel efficiency of engine 41 can be improved.

Work implement 12 is disposed forward of center of swing 210 of revolving frame 31. Control valve 46 is disposed rearward of center of swing 210 of revolving frame 31. First branch portion 140 is disposed rearward of center of swing 210 of revolving frame 31.

According to hydraulic excavator 100 configured in this way, first branch portion 140 is disposed on the same rear side as control valve 46. Thus, the pressure loss in first pipe 51 can be reduced.

First actuator 20A and second actuator 20B each are a hydraulic cylinder.

Hydraulic excavator 100 configured in this way can improve the energy efficiency during driving of work implement 12 by a hydraulic cylinder.

Each of first actuator 20A and second actuator 20B includes piston rod 26. Each of first actuator 20A and second actuator 20B is provided with rod-side hydraulic chamber 27 and bottom-side hydraulic chamber 28. Piston rod 26 is disposed in rod-side hydraulic chamber 27. Piston rod 26 is not disposed in bottom-side hydraulic chamber 28. Through first pipe 51, oil flows between control valve 46 and each of bottom-side hydraulic chamber 28 of first actuator 20A and bottom-side hydraulic chamber 28 of second actuator 20B.

According to hydraulic excavator 100 configured in this way, the effect of reducing the pressure loss on first pipe 51 can be more effectively achieved.

Hydraulic excavator 100 further includes second pipe 71. Through second pipe 71 that is independent of first pipe 51, hydraulic oil flows between control valve 46 and each of first actuator 20A and second actuator 20B. First pipe 51 and second pipe 71 include a first section 310 in which first pipe 51 and second pipe 71 extend to overlap with each other in a top view.

According to hydraulic excavator 100 configured in this way, first pipe 51 and second pipe 71 can be routed in a compact space.

First branch portion 140 is provided in first section 310.

According to hydraulic excavator 100 configured in this way, first pipe 51 and second pipe 71 can be routed in a further more compact space.

Hydraulic excavator 100 further includes holder 86 in first section 310. Holder 86 has first holding portion 88 configured to hold first pipe 51 to revolving frame 31 and second holding portion 89 configured to hold second pipe 71 to revolving frame 31.

According to hydraulic excavator 100 configured in this way, first pipe 51 and second pipe 71 can be held in a simple configuration.

Second conduit 120 and third conduit 130 have second section 320 in which second conduit 120 and third conduit 130 extend from first branch portion 140 to overlap with each other in a top view.

According to hydraulic excavator 100 configured in this way, first pipe 51 can be routed in a compact space.

First branch portion 140 is provided on the side closer to control valve 46 with respect to center position 220 of first pipe 51 in the front-rear direction between control valve 46 and each of first actuator 20A and second actuator 20B.

According to hydraulic excavator 100 configured in this way, the pressure loss on first pipe 51 can be reduced.

In first branch portion 140, first conduit 110 forms a branch angle with each of second conduit 120 and third conduit 130, the branch angle being greater than 90° and equal to or less than 180°.

According to hydraulic excavator 100 configured in this way, the pressure loss in first branch portion 140 can be reduced.

In first branch portion 140, first conduit 110 and second conduit 120 form a branch angle of 180°. In first branch portion 140, first conduit 110 and third conduit 130 form an obtuse branch angle.

According to hydraulic excavator 100 configured in this way, the pressure loss between first conduit 110 and second conduit 120 in first branch portion 140 can be more effectively reduced.

The sum of the cross-sectional area of the flow passage of the hydraulic oil in second conduit 120 and the cross-sectional area of the flow passage of the hydraulic oil in third conduit 130 is greater than the cross-sectional area of the flow passage of the hydraulic oil in first conduit 110.

According to the hydraulic excavator configured in this way, the length of first conduit 110 having a relatively small cross-sectional area of the flow passage of hydraulic oil is designed to be shorter while the length of each of second conduit 120 and third conduit 130 having a relatively large sum of their cross-sectional areas of the flow passages of hydraulic oil is designed to be longer, so that the pressure loss in first pipe 51 can be reduced.

When boom 16 is driven by three or more actuators, the branch portion at which the conduit from control valve 46 branches into a plurality of conduits extending toward three or more actuators may be provided rearward of center of swing 210 of revolving frame 31. When arm 17 or bucket 18 is driven by a plurality of actuators, the present disclosure may be applied to a pipe through which hydraulic pressure is supplied to arm 17 or bucket 18.

Second Embodiment

Figure 14:
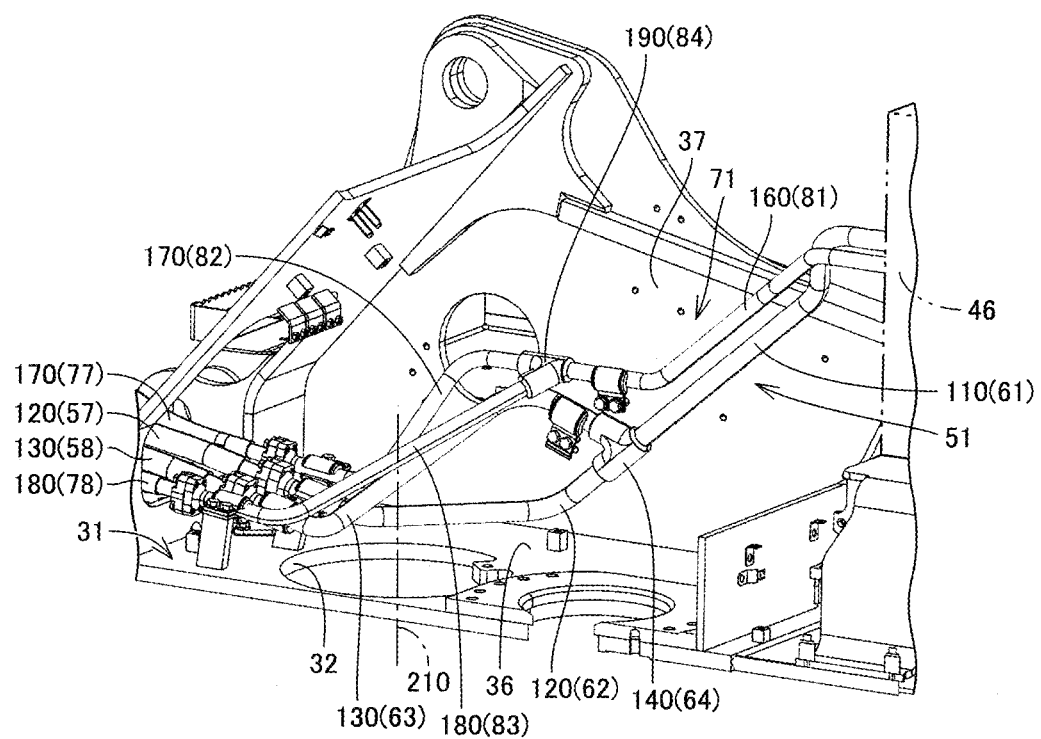
FIG. 14 is a perspective view showing a pipe that connects a driving actuator of a boom and a control valve in a hydraulic excavator in the second embodiment of the present disclosure.
Figure 15:
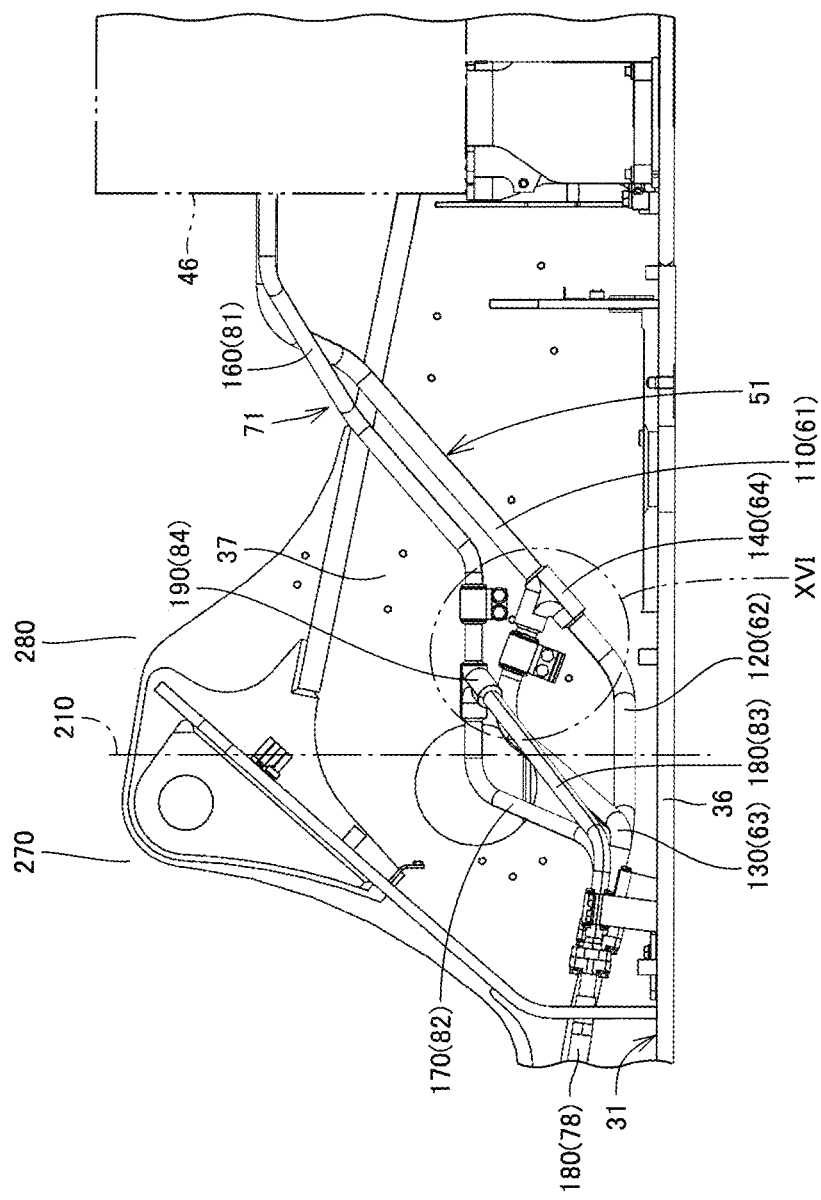
FIG. 15 is a side view showing a pipe that connects a driving actuator of a boom and a control valve.
Figure 16:
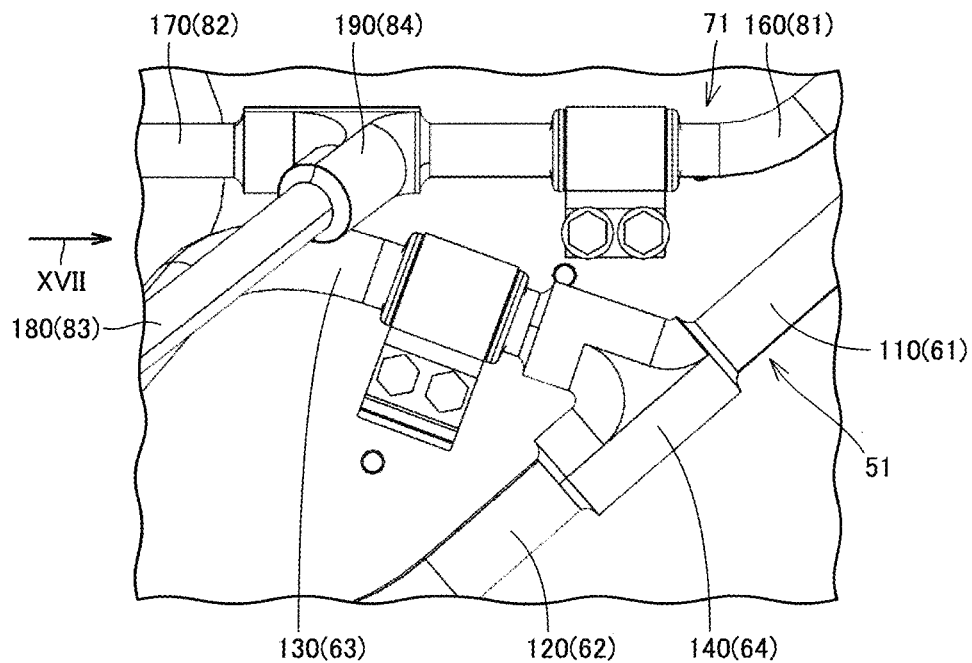
FIG. 16 is an enlarged side view showing the range surrounded by a two-dot chain line XVI in FIG. 15.
Figure 17:
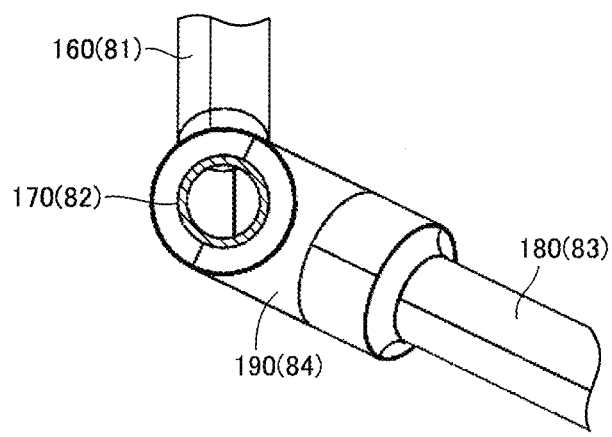
FIG. 17 is a front view showing a second pipe seen from the direction indicated by an arrow XVII in FIG. 16.

FIG. 14 is a perspective view showing a pipe that connects a driving actuator of a boom and a control valve in a hydraulic excavator in the second embodiment of the present disclosure. FIG. 15 is a side view showing the pipe that connects the driving actuator of the boom and the control valve. FIG. 16 is an enlarged side view showing the range surrounded by a two-dot chain line XVI in FIG. 15. FIG. 17 is a front view showing a second pipe seen from the direction indicated by an arrow XVII in FIG. 16.

In the hydraulic excavator in the second embodiment of the present disclosure, second branch portion 190 is provided in second pipe 71 at a position different from that in hydraulic excavator 100 in the first embodiment. In the following, the same structures as those in hydraulic excavator 100 in the first embodiment will not be repeatedly described.

As shown in FIGS. 14 to 17, in second pipe 71, second branch portion 190 (three-way pipe joint 84) is disposed together with control valve 46 in second region 280.

Second branch portion 190 is disposed rearward of center of swing 210 of revolving frame 31. Second branch portion 190 is disposed between center of swing 210 of revolving frame 31 and control valve 46 in the front-rear direction.

Second branch portion 190 is disposed at the position displaced from first branch portion 140 in the front-rear direction. Second branch portion 190 is disposed at the position displaced forward from first branch portion 140. Second branch portion 190 is disposed at the position displaced from first branch portion 140 in the height direction. Second branch portion 190 is disposed at the position higher than first branch portion 140.

Second branch portion 190 may be provided at the position displaced rearward from first branch portion 140. Second branch portion 190 may be provided at the position lower than first branch portion 140.

The configuration as described above can reduce the pressure loss occurring while hydraulic oil flows through first conduit 110 of first pipe 51, and also can reduce the pressure loss occurring while hydraulic oil flows through fourth conduit 160 of second pipe 71.

According to the hydraulic excavator in the second embodiment of the present disclosure configured in this way, the effect described in the first embodiment can be similarly achieved.

The following is a collective explanation about the configuration and the effect of the hydraulic excavator in the second embodiment of the present disclosure. The hydraulic excavator in the second embodiment of the present disclosure further includes second pipe 71. Through second pipe 71, oil flows between control valve 46 and each of rod-side hydraulic chamber 27 of first actuator 20A and rod-side hydraulic chamber 27 of second actuator 20B. Second pipe 71 includes fourth conduit 160, fifth conduit 170, sixth conduit 180, and second branch portion 190. Fourth conduit 160 is connected to control valve 46. Fifth conduit 170 is connected to first actuator 20A. Sixth conduit 180 is connected to second actuator 20B. Second branch portion 190 is disposed in second region 280. At second branch portion 190, fourth conduit 160 branches into fifth conduit 170 and sixth conduit 180.

According to the hydraulic excavator configured in this way, not only the pressure loss on first pipe 51 but also the pressure loss on second pipe 71 can be reduced.

Third Embodiment

Figure 18:
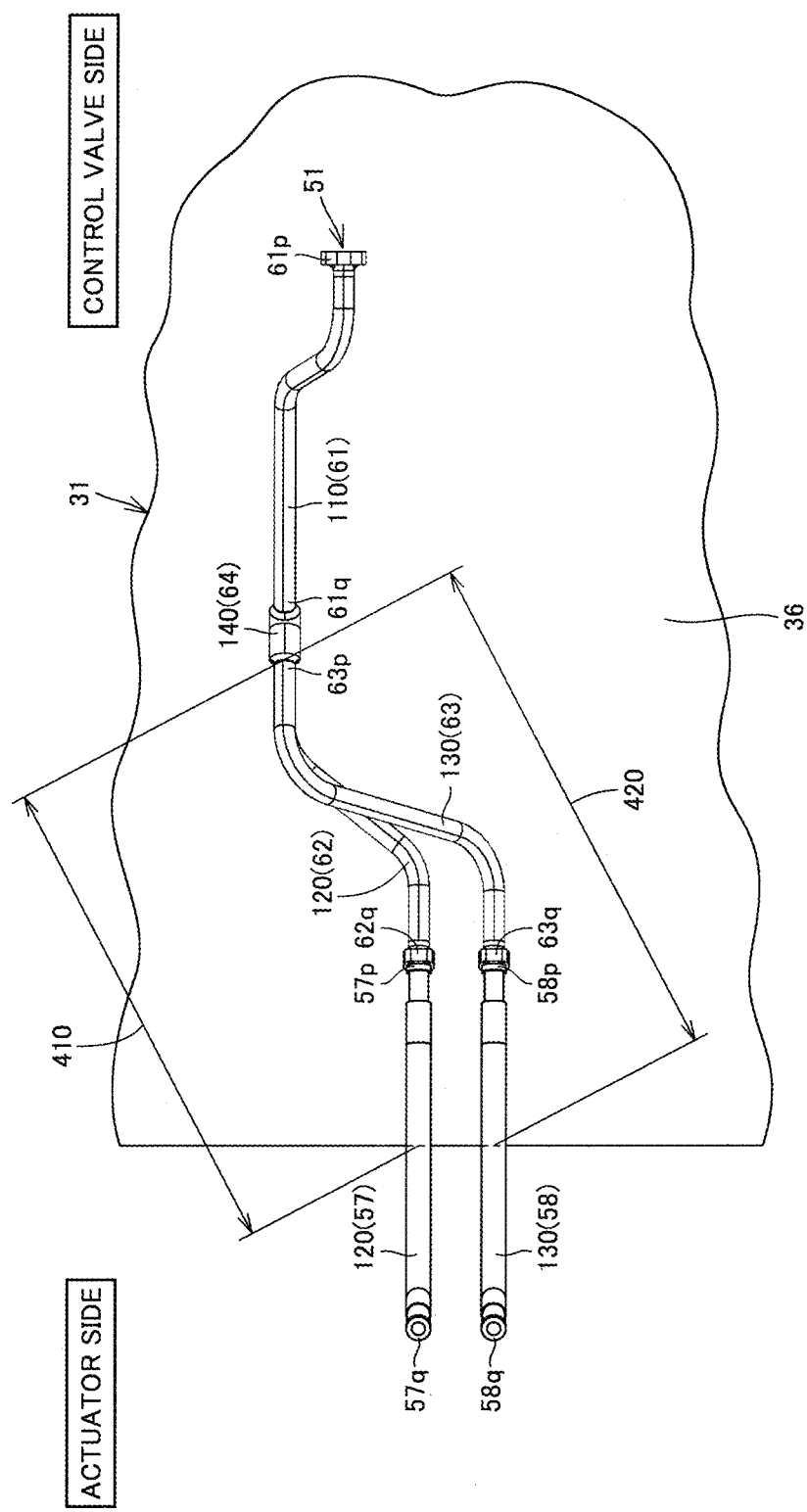
FIG. 18 is a top view showing a pipe that connects a driving actuator of a boom and a control valve in a hydraulic excavator in the third embodiment of the present disclosure.
Figure 19:
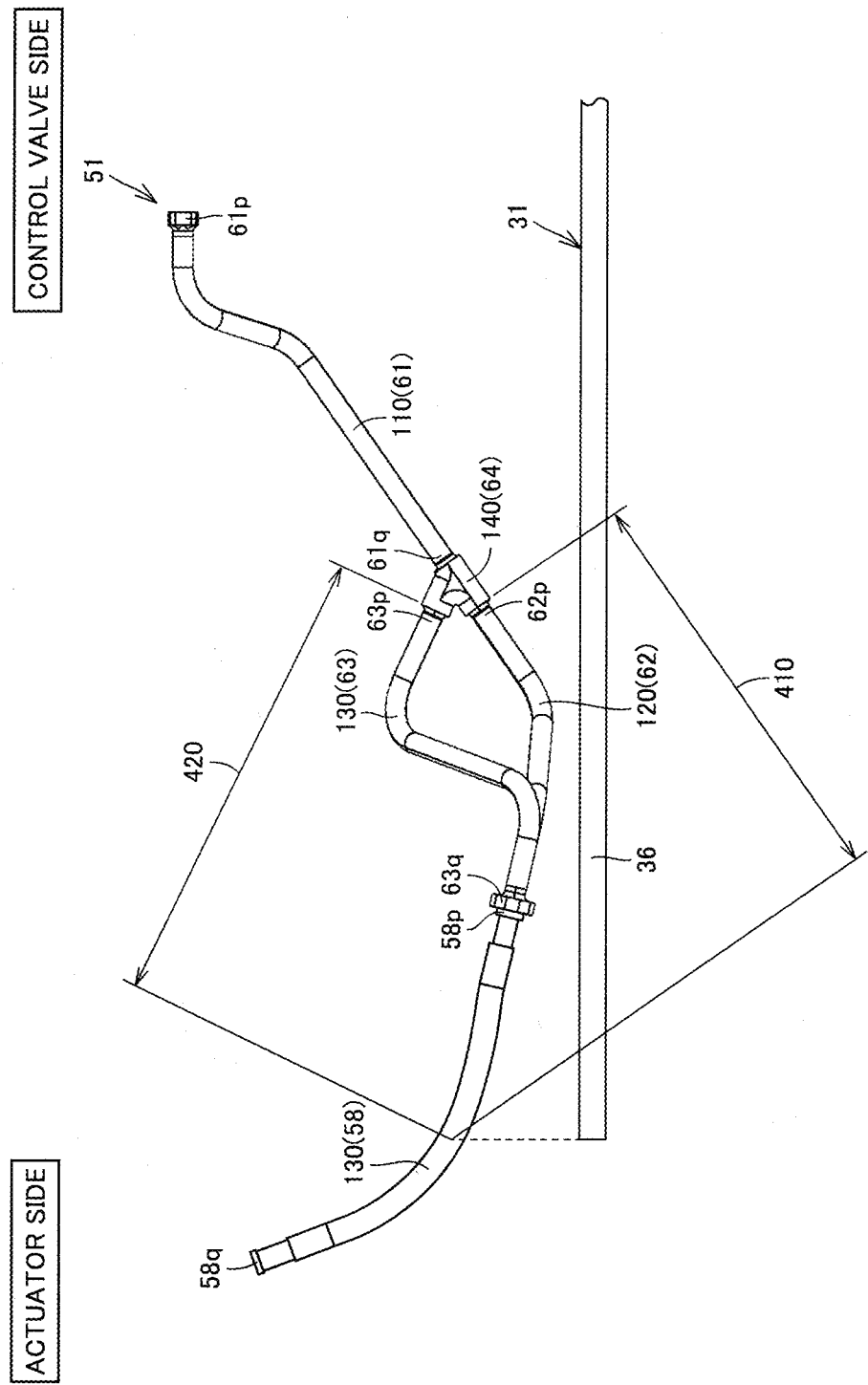
FIG. 19 is a side view showing the pipe that connects the driving actuator of the boom and the control valve in the hydraulic excavator in the third embodiment of the present disclosure.

FIG. 18 is a top view showing a pipe that connects a driving actuator of a boom and a control valve in a hydraulic excavator in the third embodiment of the present disclosure. FIG. 19 is a side view showing the pipe that connects the driving actuator of the boom and the control valve in the hydraulic excavator in the third embodiment of the present disclosure.

The hydraulic excavator in the present embodiment has the same pipe structure as that of hydraulic excavator 100 disclosed in FIGS. 1 to 12, but exhibits the relation of magnitude (described below) between the length of first conduit 110 and the length of each of second conduit 120 and third conduit 130.

As shown in FIGS. 18 and 19, first conduit 110 is shorter in length than second conduit 120. First conduit 110 is shorter in length than third conduit 130.

The length of first conduit 110 corresponds to the length of steel pipe 61 from one end 61p of steel pipe 61 to the other end 61q of steel pipe 61. The length of second conduit 120 corresponds to the length of steel pipe 62 and hydraulic hose 57 from one end 62p of steel pipe 62 to the other end 57q of hydraulic hose 57. The length of third conduit 130 corresponds to the length of steel pipe 63 and hydraulic hose 58 from one end 63p of steel pipe 63 to the other end 58q of hydraulic hose 58.

When the cross-sectional area of the flow passage of hydraulic oil in first pipe 51 is smaller, the pressure loss becomes larger. In contrast, the length of first conduit 110 having a smaller cross-sectional area of the flow passage of hydraulic oil in first pipe 51 is shorter than the length of each of second conduit 120 and third conduit 130 each having a larger cross-sectional area of the flow passage of hydraulic oil in first pipe 51. Accordingly, the pressure loss occurring while the hydraulic oil flows through first pipe 51 can be reduced.

Second conduit 120 has a first area 410. First area 410 is located above revolving frame 31. First area 410 corresponds to a part of second conduit 120 that overlaps with revolving frame 31 in a top view of the hydraulic excavator. First area 410 corresponds to an entire portion of steel pipe 62 and a part of hydraulic hose 57 that overlaps with revolving frame 31 in a top view of the hydraulic excavator.

Third conduit 130 has a second area 420. Second area 420 is located above revolving frame 31. Second area 420 corresponds to a part of third conduit 130 that overlaps with revolving frame 31 in a top view of the hydraulic excavator. Second area 420 corresponds to an entire portion of steel pipes 63 and a part of hydraulic hose 58 that overlaps with revolving frame 31 in a top view of the hydraulic excavator.

Further more preferably, first conduit 110 is shorter in length than first area 410. First conduit 110 is shorter in length than second area 420. According to the configuration as described above, first conduit 110 designed to be shorter can more effectively reduce the pressure loss occurring when the hydraulic oil flows through first pipe 51.

The following is a collective explanation about the configuration and the effect of the hydraulic excavator as a work machine in the third embodiment of the present disclosure as described above. The hydraulic excavator in the third embodiment of the present disclosure includes revolving frame 31 as a vehicular body frame, work implement 12, control valve 46, and first pipe 51 as a pipe. Work implement 12 includes first actuator 20A and second actuator 20B. Control valve 46 is provided above revolving frame 31. Through first pipe 51, hydraulic oil flows between control valve 46 and each of first actuator 20A and second actuator 20B. First pipe 51 includes first conduit 110, second conduit 120, third conduit 130, and first branch portion 140 as a branch portion. First conduit 110 is connected to control valve 46. Second conduit 120 is connected to first actuator 20A. Third conduit 130 is connected to second actuator 20B. At first branch portion 140, first conduit 110 branches into second conduit 120 and third conduit 130. First conduit 110 is shorter in length than second conduit 120 and shorter in length than third conduit 130.

According to the hydraulic excavator configured in this way, first conduit 110 is shorter in length than second conduit 120 and shorter in length than third conduit 130, so that the pressure loss in first pipe 51 can be reduced. Thereby, the energy efficiency during driving of work implement 12 can be increased, and the fuel efficiency of engine 41 can be improved.

Further preferably, second conduit 120 has first area 410 located above revolving frame 31. Third conduit 130 has second area 420 located above revolving frame 31. First conduit 110 is shorter in length than first area 410, and shorter in length than second area 420.

According to the hydraulic excavator configured in this way, the pressure loss in first pipe 51 can be further reduced.

In addition, the vehicular body frame in the present disclosure is not limited to revolving frame 31 capable of swinging, but may be a fixed-type frame. Also, the present embodiment has a configuration in which work implement 12 and control valve 46 are disposed forward and rearward, respectively, of center of swing 210 of revolving frame 31, but the present disclosure is not limited thereto. For example, both work implement 12 and control valve 46 may be disposed forward of center of swing 210 of revolving frame 31.

Fourth Embodiment

Figure 20:
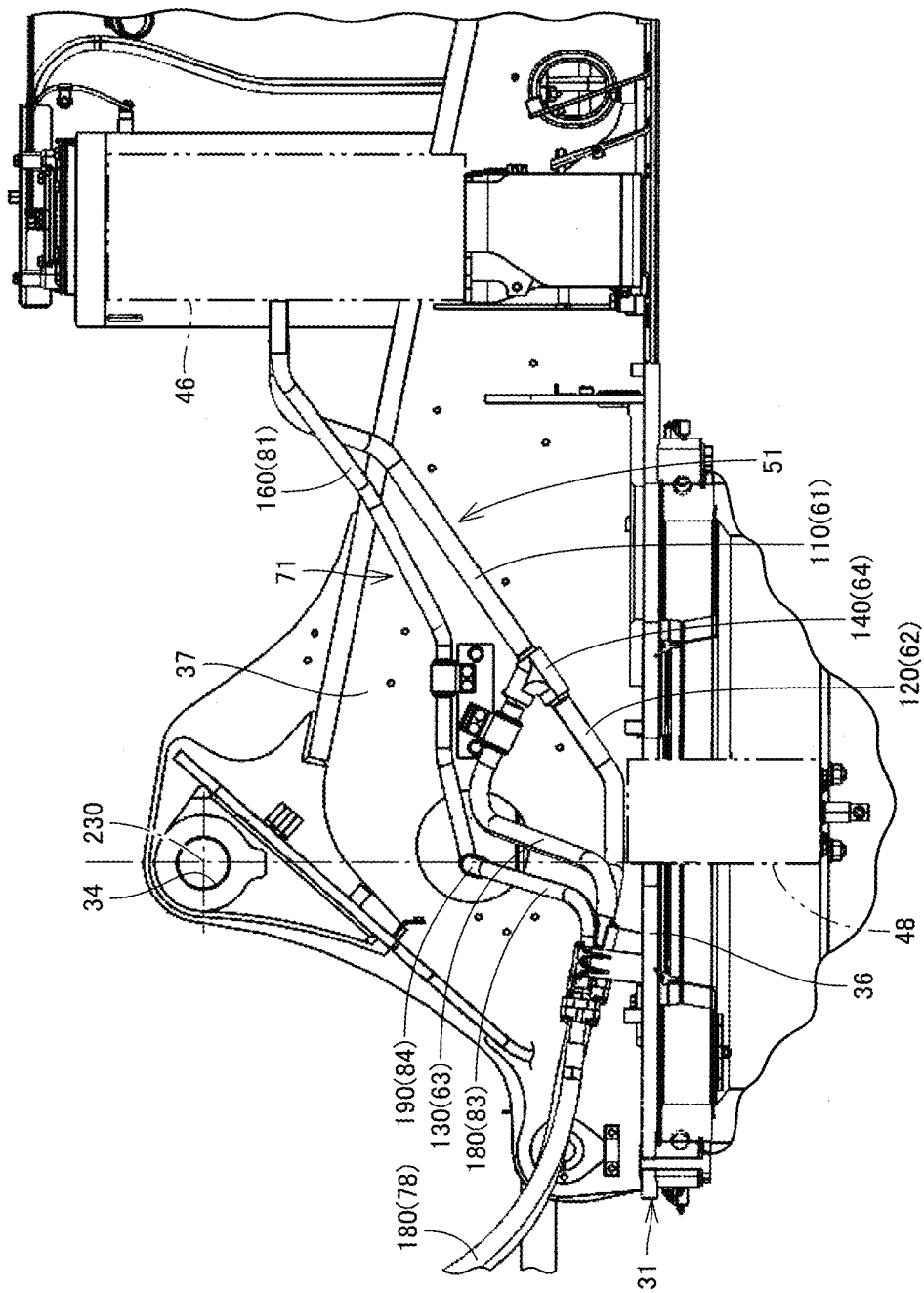
FIG. 20 is a side view showing a pipe that connects a driving actuator of a boom and a control valve in a hydraulic excavator in the fourth embodiment of the present disclosure.

FIG. 20 is a side view showing a pipe that connects a driving actuator of a boom and a control valve in a hydraulic excavator in the fourth embodiment of the present disclosure.

The hydraulic excavator in the present embodiment has the same pipe structure as that of hydraulic excavator 100 disclosed in FIGS. 1 to 12. Also, the position of first branch portion 140 is defined in the relation with a pivot center 230 of work implement 12 with respect to revolving frame 31.

As shown in FIG. 20, revolving frame 31 is provided with an opening 34. Opening 34 penetrates through vertical plate 37 and vertical plate 38. Boom pin 23 is inserted into opening 34 (see FIG. 1). The center of opening 34 is defined as pivot center 230 of work implement 12 (boom 16) with respect to revolving frame 31. Pivot center 230 is an axis extending in the right-left direction.

First actuator 20A and second actuator 20B are disposed forward of pivot center 230 of work implement 12 with respect to revolving frame 31. Control valve 46 is disposed rearward of pivot center 230 of work implement 12 with respect to revolving frame 31.

First branch portion 140 is disposed rearward of pivot center 230 of work implement 12 with respect to revolving frame 31. First branch portion 140 is disposed between pivot center 230 of work implement 12 with respect to revolving frame 31 and control valve 46 in the front-rear direction.

When the cross-sectional area of the flow passage of the hydraulic oil in first pipe 51 is smaller, the pressure loss becomes larger. In contrast, by disposing first branch portion 140 rearward of pivot center 230 of work implement 12 with respect to revolving frame 31, first conduit 110 can be designed to be shorter while second conduit 120 and third conduit 130 branched from first conduit 110 can be designed to be longer. In this case, the sum of the cross-sectional area of the flow passage of the hydraulic oil in second conduit 120 and the cross-sectional area of the flow passage of the hydraulic oil in third conduit 130 is greater than the cross-sectional area of the flow passage of the oil in first conduit 110. Thus, first branch portion 140 is disposed on the same side as control valve 46 with respect to pivot center 230 of work implement 12 relative to revolving frame 31. Thereby, the section having a larger cross-sectional area in first pipe 51 can be increased, so that the pressure loss can be reduced.

The following is a collective explanation about the configuration and the effect of the hydraulic excavator as a work machine in the fourth embodiment of the present disclosure as described above. The hydraulic excavator in the fourth embodiment of the present disclosure includes revolving frame 31 as a vehicular body frame, work implement 12, control valve 46, and first pipe 51 as a pipe. Work implement 12 includes first actuator 20A and second actuator 20B, and is rotatably connected to revolving frame 31. Control valve 46 is provided above revolving frame 31. Through first pipe 51, hydraulic oil flows between control valve 46 and each of first actuator 20A and second actuator 20B. First actuator 20A and second actuator 20B are disposed forward of pivot center 230 of work implement 12 with respect to revolving frame 31. Control valve 46 is disposed rearward of pivot center 230 of work implement 12 with respect to revolving frame 31. First pipe 51 includes first conduit 110, second conduit 120, third conduit 130, and first branch portion 140 as a branch portion. First conduit 110 is connected to control valve 46. Second conduit 120 is connected to first actuator 20A. Third conduit 130 is connected to second actuator 20B. First branch portion 140 is disposed rearward of pivot center 230 of work implement 12 with respect to revolving frame 31. At first branch portion 140, first conduit 110 branches into second conduit 120 and third conduit 130.

According to the hydraulic excavator configured in this way, first branch portion 140 is disposed rearward of pivot center 230 of work implement 12 with respect to revolving frame 31, so that the pressure loss in first pipe 51 can be reduced. Thereby, the energy efficiency during driving of work implement 12 can be increased, and the fuel efficiency of engine 41 can be improved.

In addition, the vehicular body frame in the present disclosure is not limited to revolving frame 31 capable of swinging, but may be a fixed-type frame.

The present disclosure is applicable to various kinds of work machines each including a work implement. The work machine in the present disclosure may also include a bulldozer, a wheel loader, a motor grader, a crane, a forestry machine, and the like. The work implement in the present disclosure may also include a ripper, a ripper bucket, a fork, a cutter, and the like. The actuator in the present disclosure is not particularly limited to any apparatus as long as it performs operations such as extension and contraction, bending and extending, rotation and the like with hydraulic energy, and may include a hydraulic motor and the like, for example.

It should be understood that the embodiments disclosed herein are illustrative and non-restrictive in every respect. The scope of the present invention is defined by the terms of the claims, rather than the description above, and is intended to include any modifications within the meaning and scope equivalent to the terms of the claims.

INDUSTRIAL APPLICABILITY

The present disclosure is applied to a work machine including a work implement.

REFERENCE SIGNS LIST 11 main body, 12 work implement, 13 revolving unit, 14 operator's cab, 14S operator's seat, 15 travelling device, 15Cr crawler belt, 15M travel motor, 16 boom, 17 arm, 18 bucket, 19 engine compartment, 20 actuator, 20A first actuator, 20B second actuator, 21, 22 actuator, 23 boom pin, 24 arm pin, 25 bucket pin, 26 piston rod, 27 rod-side hydraulic chamber, 28 bottom-side hydraulic chamber, 29 piston, 30 cylinder, 31 revolving frame, 32, 34 opening, 36 bottom plate portion, 37, 38 vertical plate, 41 engine, 42 hydraulic pump, 43 hydraulic oil tank, 46 control valve, 47 slewing motor, 48 swivel joint, 51 first pipe, 57, 58, 77, 78, 91, 95, 96 hydraulic hose, 57$p$, 58$p$, 61$p$, 62$p$, 63$p$ one end, 57$q$, 58$q$, 61$q$. 62$q$, 63$q$ the other end, 61, 62, 63, 81, 82, 83, 93, 94 steel pipe, 64, 84 three-way pipe joint, 71 second pipe, 86 holder, 87 base portion, 87$s$ plate-shaped portion, 87$t$ first pillar-shaped portion, 87$u$ second pillar-shaped portion, 88 first holding portion, 89 second holding portion, 92 branch block, 100 hydraulic excavator, 110 first conduit, 120 second conduit, 130 third conduit, 140 first branch portion, 160 fourth conduit, 170 fifth conduit, 180 sixth conduit, 190 second branch portion, 210 center of swing, 220 center position, 230 pivot center, 260 virtual straight line, 270 first region, 280 second region, 310 first section, 320 second section, 410 first area, 420 second area.

The invention claimed is:

1. A work machine comprising:
a revolving frame;
a work implement including a first actuator and a second actuator, wherein at least one of the first actuator and the second actuator is a hydraulic cylinder;
a control valve provided above the revolving frame; and
a first pipe through which hydraulic oil flows between the control valve and each of the first actuator and the second actuator,
the first pipe including
a first conduit connected to the control valve,
a second conduit connected to the first actuator,
a third conduit connected to the second actuator, and
a first branch portion at which the first conduit branches into the second conduit and the third conduit, wherein
in a top view,
a first region is defined on one side with respect to a virtual straight line passing through a center of swing of the revolving frame, and
a second region is defined on the other side with respect to the virtual straight line,
in the first region, the work implement is disposed, and
in the second region, the control valve and the first branch portion are disposed.

2. The work machine according to claim 1, wherein
the work implement is disposed forward of the center of swing of the revolving frame,
the control valve is disposed rearward of the center of swing of the revolving frame, and
the first branch portion is disposed rearward of the center of swing of the revolving frame.

3. The work machine according to claim 2, wherein the first branch portion is provided between the control valve and each of the first actuator and the second actuator so as to be located close closer to the control valve with respect to a center position of the first pipe in a front-rear direction.

4. The work machine according to claim 1, further comprising a second pipe through which hydraulic oil flows between the control valve and each of the first actuator and the second actuator, the second pipe being independent of the first pipe, wherein
the first pipe and the second pipe include a first section in which the first pipe and the second pipe extend to overlap with each other in a top view.

5. The work machine according to claim 4, wherein the first branch portion is provided in the first section.

6. The work machine according to claim 4, further comprising a holder in the first section, the holder including
a first holding portion configured to hold the first pipe to the revolving frame, and
a second holding portion configured to hold the second pipe to the revolving frame.

7. The work machine according to claim 1, wherein the second conduit and the third conduit include a second section in which the second conduit and the third conduit extend from the first branch portion to overlap with each other in a top view.

8. A work machine comprising:
a revolving frame;
a work implement including a first actuator and a second actuator, wherein the first actuator and the second actuator each are a hydraulic cylinder;
a control valve provided above the revolving frame; and
a first pipe through which hydraulic oil flows between the control valve and each of the first actuator and the second actuator,
the first pipe including
a first conduit connected to the control valve,
a second conduit connected to the first actuator,
a third conduit connected to the second actuator, and
a first branch portion at which the first conduit branches into the second conduit and the third conduit, wherein
in a top view,
a first region is defined on one side with respect to a virtual straight line passing through a center of swing of the revolving frame, and
a second region is defined on the other side with respect to the virtual straight line,
in the first region, the work implement is disposed, and
in the second region, the control valve and the first branch portion are disposed.

9. The work machine according to claim 8, wherein each of the first actuator and the second actuator includes a piston rod,
each of the first actuator and the second actuator is provided with
a rod-side hydraulic chamber in which the piston rod is disposed, and
a bottom-side hydraulic chamber in which the piston rod is not disposed, and
through the first pipe, hydraulic oil flows between the control valve and each of the bottom-side hydraulic chamber of the first actuator and the bottom-side hydraulic chamber of the second actuator.

10. The work machine according to claim 9, further comprising a second pipe through which hydraulic oil flows between the control valve and each of the rod-side hydraulic chamber of the first actuator and the rod-side hydraulic chamber of the second actuator, wherein
the second pipe includes
a fourth conduit connected to the control valve,
a fifth conduit connected to the first actuator,
a sixth conduit connected to the second actuator, and
a second branch portion disposed in the second region, and
at the second branch portion, the fourth conduit branches into the fifth conduit and the sixth conduit.

11. A work machine comprising:
a revolving frame;
a work implement including a first actuator and a second actuator;
a control valve provided above the revolving frame; and
a first pipe through which hydraulic oil flows between the control valve and each of the first actuator and the second actuator,
the first pipe including
a first conduit connected to the control valve,
a second conduit connected to the first actuator,
a third conduit connected to the second actuator, and a first branch portion at which the first conduit branches into the second conduit and the third conduit, wherein in a top view,
a first region is defined on one side with respect to a virtual straight line passing through a center of swing of the revolving frame, and
a second region is defined on the other side with respect to the virtual straight line, in the first region, the work implement is disposed,
in the second region, the control valve and the first branch portion are disposed, and
the first conduit forms a branch angle with each of the second conduit and the third conduit in the first branch portion, the branch angle being greater than 90° and equal to or less than 180°.

12. The work machine according to claim 11, wherein the first conduit and the second conduit form a branch angle of 180° in the first branch portion, and
the first conduit and the third conduit form an obtuse branch angle in the first branch portion.

13. A work machine comprising:
a vehicular body frame;
a work implement including a first actuator and a second actuator, wherein at least one of the first actuator and the second actuator is a hydraulic cylinder;
a control valve provided above the vehicular body frame; and
a pipe through which hydraulic oil flows between the control valve and each of the first actuator and the second actuator,
the pipe including
a first conduit connected to the control valve,
a second conduit connected to the first actuator,
a third conduit connected to the second actuator, and
a branch portion at which the first conduit branches into the second conduit and the third conduit,
the first conduit being shorter in length than the second conduit, and shorter in length than the third conduit.

14. The work machine according to claim 13, wherein the second conduit includes a first area located above the vehicular body frame,
the third conduit includes a second area located above the vehicular body frame, and
the first conduit is shorter in length than the first area and shorter in length than the second area.

15. A work machine comprising:
a vehicular body frame;
a work implement including a first actuator and a second actuator, and rotatably connected to the vehicular body frame;
a control valve provided above the vehicular body frame; and
a pipe through which hydraulic oil flows between the control valve and each of the first actuator and the second actuator,
the first actuator and the second actuator being disposed forward of a pivot center of the work implement with respect to the vehicular body frame,
the control valve being disposed rearward of the pivot center of the work implement with respect to the vehicular body frame,
the pipe including
a first conduit connected to the control valve,
a second conduit connected to the first actuator,
a third conduit connected to the second actuator, and
a branch portion at which the first conduit branches into the second conduit and the third conduit, the branch portion being disposed rearward of the pivot center of the work implement with respect to the vehicular body frame.

16. The work machine according to claim 1, wherein a sum of a cross-sectional area of a flow passage of hydraulic oil in the second conduit and a cross-sectional area of a flow passage of hydraulic oil in the third conduit is greater than a cross-sectional area of a flow passage of hydraulic oil in the first conduit.

* * * * *